United States Patent [19]

Bähr

[11] 4,266,474
[45] May 12, 1981

[54] CHAMBER TYPE FILTER PRESS FOR DE-WATERING SLUDGES AND SIMILAR SUBSTANCES

[76] Inventor: Albert Bähr, Am Stockfeld 69, D-6680 Neunkirchen-Kohlhof, Fed. Rep. of Germany

[21] Appl. No.: 84,597

[22] Filed: Oct. 15, 1979

[30] Foreign Application Priority Data

Oct. 13, 1978 [DE] Fed. Rep. of Germany ....... 2844697

[51] Int. Cl.³ .......................... B30B 9/24; B01D 33/04
[52] U.S. Cl. .................................... 100/118; 100/153; 210/350; 210/401
[58] Field of Search ............... 100/118, 119, 120, 153, 100/154; 210/224, 324, 326, 330, 345, 350, 351, 352, 386, 400, 401, 402, 404, 387; 209/307, 308; 162/301; 43/6.5

[56] References Cited

U.S. PATENT DOCUMENTS

| | | | |
|---|---|---|---|
| 2,027,657 | 1/1936 | van Roggen et al. | 100/153 X |
| 2,711,130 | 6/1955 | Guettler | 100/153 |
| 3,896,030 | 7/1975 | Bahr | 210/384 |
| 3,897,341 | 7/1975 | Ozawa | 210/386 |
| 4,019,431 | 4/1977 | Bastgen | 100/37 |
| 4,142,461 | 3/1979 | Bastgen | 100/118 |
| 4,144,807 | 3/1979 | Bastgen | 100/118 |

*Primary Examiner*—Charles N. Hart
*Assistant Examiner*—David R. Sadowski
*Attorney, Agent, or Firm*—Wegner & Bretschneider

[57] ABSTRACT

A filter apparatus comprising a gravitional extraction section 1 and a high pressure section 3. In the high pressure section 3 there is a rotatable drum 35 around which a pair of filter bands 4,5 on carrier belts 6,7 are advanced with means for applying pressure to the belts to squeeze the bands and belts together to expel water from the sludge 13 through open-topped channels formed in the carrier belts. An intermediate section 2 for applying medium pressure to the sludge may be provided and the bands and belts are continuous. Various special features like cleaning, different pressure loading systems, and driving means and other modifications are described but the principle is to progressively increase the pressure by advancing the sludge between the belt and carrier assembly and to arrange for the water expelled to be diverted through the channels 8,9 in the carrier belts with no frictional drag between the respective bands and belts as they advance at the same speed.

72 Claims, 30 Drawing Figures

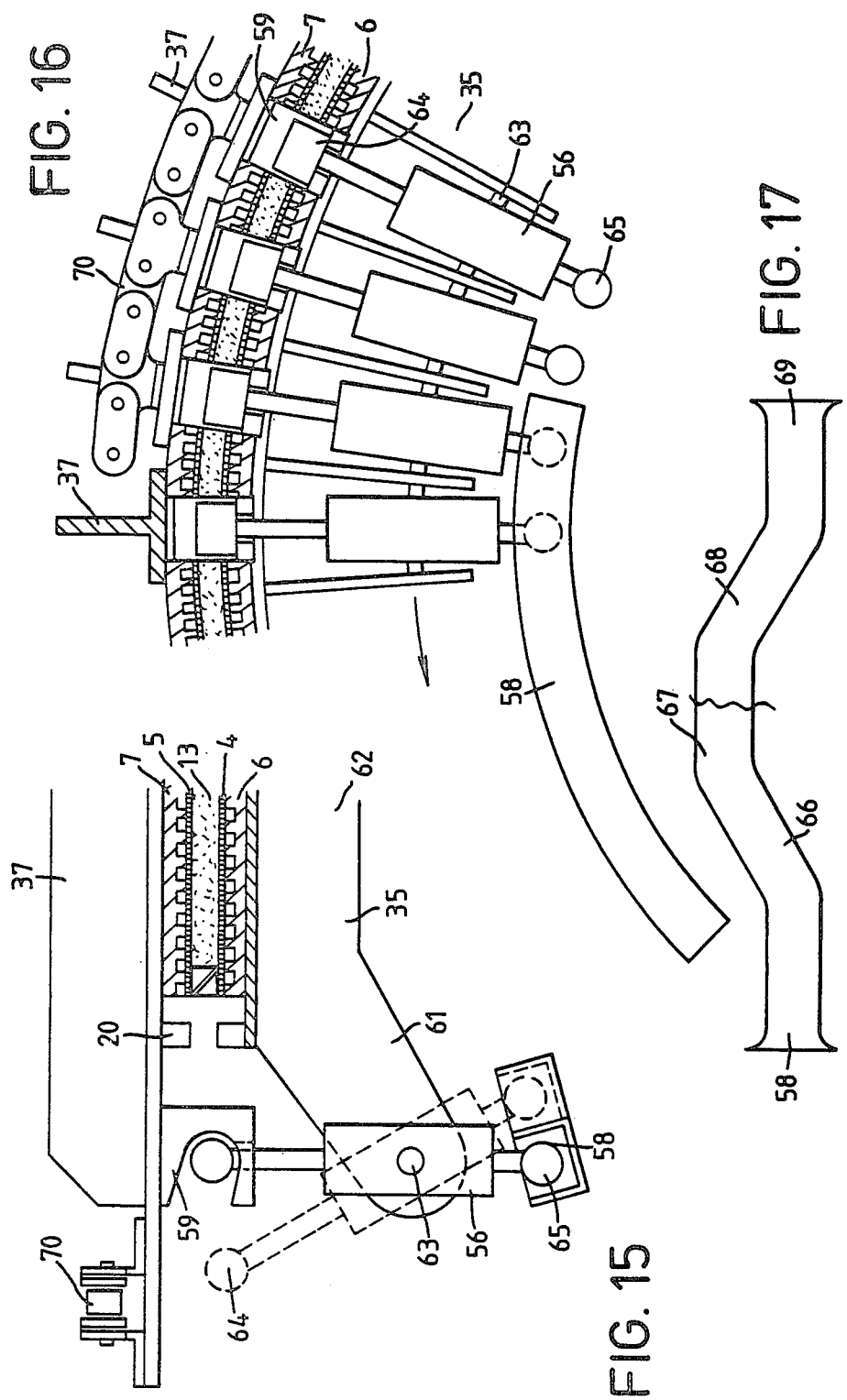

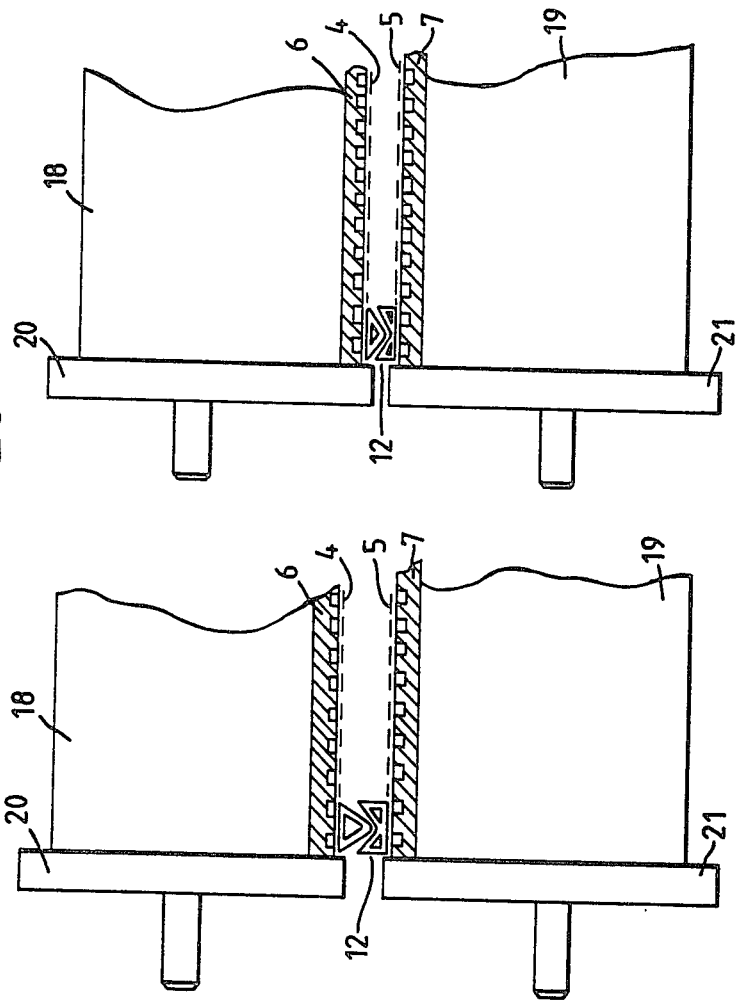

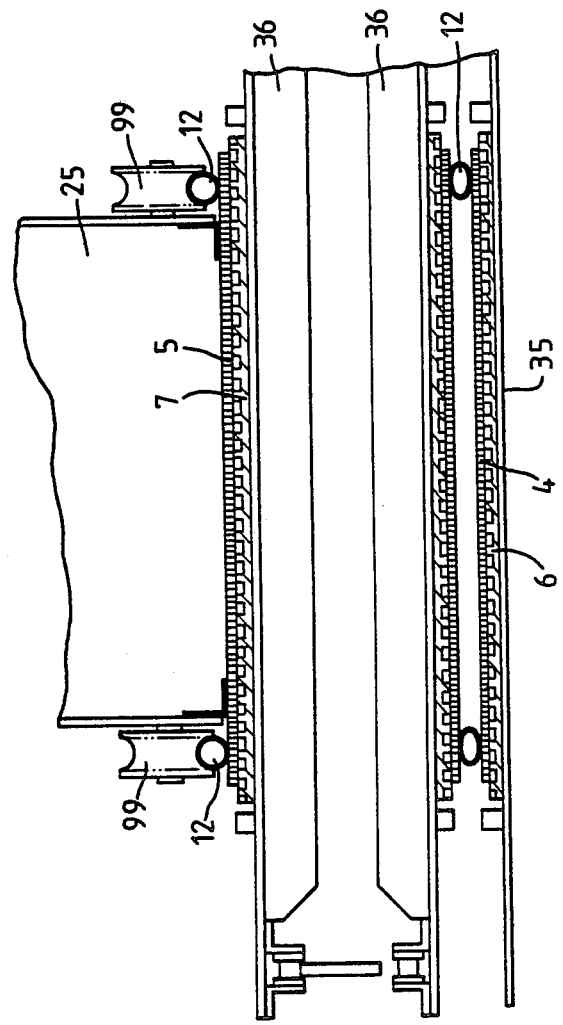

100
CHAMBER TYPE FILTER PRESS FOR DE-WATERING SLUDGES AND SIMILAR SUBSTANCES

DESCRIPTION

This invention relates to a chamber-type filter press for de-watering, or removing water from sludges and similar substances, and particularly from sludges occurring in waste-water purification plant, wherein the sludges are trapped in filter chambers which are closed on all sides thereof and means are provided for producing a high pressure which is applied to press the water out of the substance under treatment. It is commonly known to de-water sludge in waste-water purification plants, by first adding suitable organic or inorganic filtering additives to the sludge, and then passing the sludge through a chamber-type filter press. The sludge is pumped into filter chambers which are closed on all sides and generally a large number of the filter chambers are grouped together as a battery, and pumping of the wet sludge is continued under high pressure until the desired percentage of solids is reached. The water content of the sludge is forced out through dividing walls between the individual filter chambers which are made from a suitable pervious filter material. This conventional filtering method has the disadvantage of intermittent, or batch operation so that production throughput rates are relatively low when compared with overall technical and capital cost outlay involved. Moreover, the efficacy of pressure application to the sludge decreases progressively from chamber to chamber in the direction of pumping flow.

It has also been known for a long time to remove the water from sludges by a continuous process by means of a continuous belt press which comprises a horizontally extending strainer or filter belt, and a pressure applying belt arranged thereabove to squeeze the sludge.

It is also known to provide drum-type filter presses which allow continuous working, and these are certainly superior to chamber-type filter presses as far as through-put rates are concerned, but which are not so efficient in achieving high percentage recovery rates.

It is an object of the present invention to provide a chamber-type filter press which can give the special efficacy of a chamber filter press with regard to pressure application resulting in correspondingly high percentages of solids, and will permit continuous operation to achieve the high through-put rates of drum-type filter presses.

According to this invention, there is provided a chamber-type filter press for de-watering sludges and similar substances, particularly the sludges occurring in waste water purification plant, wherein the sludges are trapped in fully enclosed filter chambers and means are provided to produce a high pressure which is applied to the substances under treatment, characterised in that the chamber-type filter press is equipped with filter chambers which advance continuously in the manner of a belt-filter press and are adapted to be continuously charged and discharged, and filter chambers are closed on their top and bottom sides by filter bands supported on revolving carrier belts with sealing means along their sides and at their front and rear (as viewed in the direction of advancement) by the sludge or treated substance, and the means for producing a high pressure which is applied to the sludge comprise a plurality of co-advancing pressure producers which over at least a portion of the advancement of the filter chambers apply an increasingly high pressure to sludge or a substance contained therein. The special advantage resulting from this invention resides in that, for the very first time, the advantages of a chamber-type filter press are combined with those of a filter belt press. The degree or value of pressure which can be produced with a press according to this invention is limited only by the mechanical limitations of the chosen construction and these can be suitably modified and increased by an order of magnitude for as long as it is economically sound to squeeze out still more water by increasing pressure. For practical considerations an economically acceptable limit was found to be at approximately 50 kg/cm$^2$.

According to a preferred embodiment of the invention the chamber volume or the cross-section of the chamber continuously and progressively reduces with progressive de-watering of the chamber contents.

According to an advantageous characteristic detail of this invention each chamber is adapted to be directly and individually subjected to pressure.

According to an advantageous further development of this invention the carrier or conveyor belts are made of a flexible or plastics material advancing on idler rollers, and the surface thereof which carries the filter bands is provided with open-topped channels.

In such an arrangement the channels are preferably arranged at an angle relative to the major axis of the conveyor belts or direction of advancement, and the pressure regions extend at an inclination to the horizontal.

Also for preference, the idler rollers which carry the conveyor belts are provided with guide means for the belts.

In view of the considerable lateral rigidity of the conveyor belting such guide means may be provided simply in the form of flanges, rims or the like on the rollers. Such an arrangement achieves the special advantage of eliminating relative movement between filter bands and supporting or idler rollers for these so that even corrosive sludges can be treated without risk or problem.

It is further preferred that the path of filter-chamber advancement should be sub-divided into several sections or regions by applying different pressures to the sludge or similar substance between the filter belts.

Such divisions or regions preferably comprise at least one gravitional pre-draining stage and at least one high pressure stage. It is preferred that at least one medium pressure stage is provided between these stages.

In a preferred embodiment of the invention, the coadvancing high pressure generators for the high pressure stage may be provided in the form of a plurality of hydraulic cylinders mounted on both sides on a rotationally driven drum of comparatively large diameter, the carrier or conveyor belts with the filter bands revolving with said drum and the hydraulic cylinders being arranged in pairs and the pairs being adapted to be coupled and decoupled with cylinder supports arranged radially outside of the outer carrier belt and spanning the width of the carrier belts, which cylinder supports also advance with the belt system.

According to a preferred further development of this embodiment of the invention, the entire hydraulic system including the hoses, valves and control means for the plurality of hydraulic cylinders provided would be arranged internally of the drum, energy being supplied to the hydraulic pump via slip ring electrical collectors or the like. In one, particularly advantageous embodiment of the invention, the hydraulic cylinders are spring biassed in the operative or coupling position and stationary guide tracks or cams are provided on both sides of the drum which laterally divert the cylinders for decoupling.

For preference the pressure region which leads around the drum is sub-divided into several sectors or divisions.

To this end, the hydraulic control system is conveniently designed in such a way that the hydraulic cylinders are relieved of pressure along the circumferential regions of the path of revolution where they are decoupled or coupled, and pressure is applied in the pressure sector or division of the path of advancement and the pressure increases in the same sense as the direction of advancement.

As there is no relative movement between the filter bands, the lateral seal for the filter chambers may be provided by elastically deformable sealing strips secured to the filter bands which, on the one hand, provide an effective seal for the filter chambers and, on the other hand, take into account the important requirement for such seals to be sufficiently resilient to be able to transmit operative pressure to the sludge or other substance. The sealing strips are preferably designed in such a way that they interengage with mutually opposite or facing filter bands.

A specially preferred embodiment of the invention is further characterised in that the pre-draining device is a chamber comprising an inlet for the wet substance from which water is to be removed. The bottom or base wall of said chamber is provided by a first dewatering section of the filter band which is carried or rests on the first carrier belt.

This arrangement may be further developed by arranging for the carrier belt with the filter band supported thereon to travel away from the end which comprises the inlet for the sludge or substance to be treated and to present an inclined gradient in an upwards direction.

For preference, the chamber further comprises additional filter chambers arranged so as to be wholly or partially submerged in the wet substance under treatment and comprising outlets leading outside the chamber.

The filter elements are preferably designed in the form of rotatable drums or cylinders made of filter material. Furthermore, within the chamber there is provided an ante-chamber for the return of filtrate and preferably this is also equipped with a filter element of this type.

In a preferred embodiment of the invention all dewatering divisions or regions have a gradient inclined in the same direction.

According to a preferred embodiment of the invention, the cylinder supports which are adapted to be coupled with the hydraulic cylinders are in mutually articulated connection at their opposed ends to form a revolving armour belt whereof one run is parallel with the region of pressure application around the drum.

In a particularly preferred embodiment of such an arrangement, the cylinder supports are T-sections and the articulated joint is provided on the transverse limbs which are opposite each other along the pressure-region of the drum. This has the special advantage that smaller radii can be used at the return guide stations which are needed for the armour belt, and also it avoids variable gaps between the individual supports, at least on their pressure side.

In a modified embodiment of the invention, the supports which are adapted to be coupled with the hydraulic cylinders are designed in such a manner that they can each be driven or carried along independently of the others along the pressure region around the drum by being coupled to an hydraulic cylinder at each end thereof.

In this particular embodiment of the invention, it is preferable to provide a drive at the coupling/uncoupling stations for the supports whereby the supports are laterally diverted from the region where the filter bands and their carrier belts mount the drum and likewise moved towards the drum for re-engagement or coupling of the cylinder supports.

This embodiment of the invention may be further improved by making the drum wider than the filter bands and their carrier belts and providing the resulting marginal strip of the circumferential wall of the drum with guide means for the cylinder supports.

Conveniently these guide means are arranged in such a way as to hold the supports on the drum in a laterally slidable manner; in other words, in this arrangement the supports of the high pressure division are integral component parts of the drum itself.

In modification of coupling facilities, the hydraulic cylinders may be mounted for limited pivotal movement in the direction of drum rotation, and the coupling means for their driving engagement with the supports may consist of hook-shaped lugs which are secured to the supports and adapted to engage with the piston rods of the hydraulic rams as they enter into a path tangential to the drum and to disengage from these piston rods when they run out of said tangential path.

In advantageous further development of this invention, the T-section supports are mounted on both sides thereof on link-roller chains, the spacing ratio of T-supports relative to the chain spacing ratio being 1:3. This has the advantage that variations of radius following the variations of the thickness of the sludge or treated substance is compensated in the course of advancement of the armour belt formed by such T-supports by slackening in the link-roller chains.

A particularly preferred embodiment of the invention may also be realised by designing the idle run, or return run of the armour belt wholly or partly as a co-advancing supporting base for a medium pressure stage.

In detail, this can be achieved by using pressure rollers which are biased in the direction of the armour belt to form the medium pressure stage, with two carrier belts complete with filter bands co-revolving between these pressure rollers and the armour belt.

In a special embodiment of the invention the preliminary or pre-draining stage may consist of a fully enclosed and sealed chamber, the chamber walls being chiefly provided by revolving carrier belts and filter bands, wherein pressure can be built up by the sludge pump itself. Such an arrangement enables a particularly effective preliminary drainage of the sludge substance under treatment, and may conceivably allow direct progress from the preliminary drainage to the high pressure stage, or at any rate will necessitate only a comparatively brief intervening medium pressure stage in order to impart the correct consistency to the sludge for the final high pressure stage treatment.

Further advantageous and inventive details of this invention are explained in the description and shown in the drawings with associated explanatory text which illustrate a few embodiments of the invention, by way of example, and wherein:

FIG. 15 shows a sectional detail of the chamber-type filter press of FIGS. 2 and 7;

FIG. 16 is a side elevation of a detail of FIG. 1;

FIG. 17 is a fragmentary view of a control cam or curve face for controlling movement of parts depicted in FIGS. 15 and 16;

Figure 27:
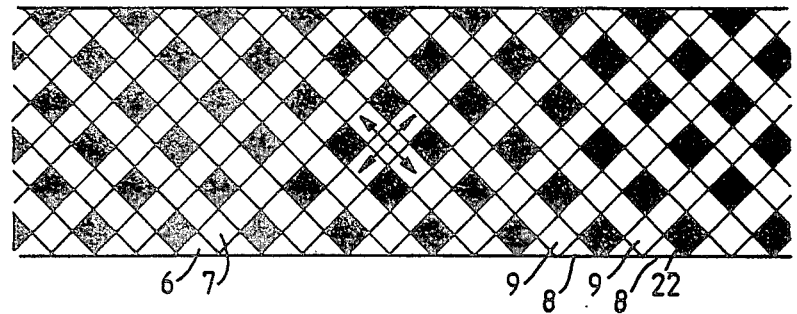
Figure 28:
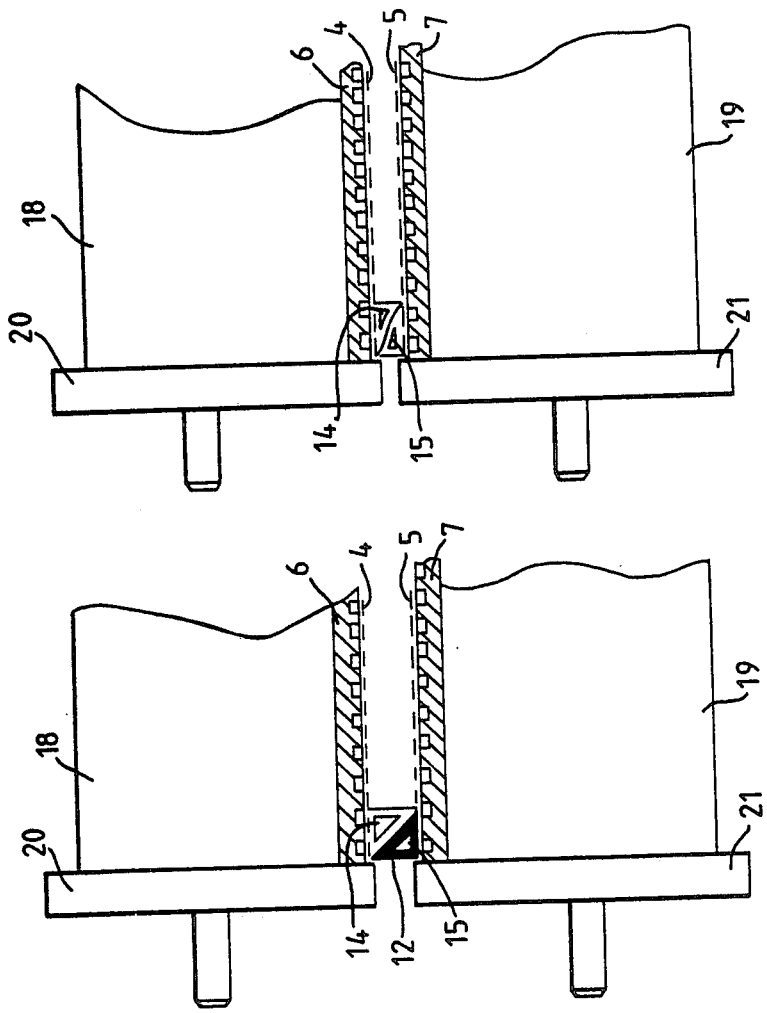

FIG. 27 schematically shows the relative disposition of the channels and superposed carrier belts;

FIG. 28 shows details of the lateral sealing means in two different pressure phases;

FIG. 29 is a view similar to FIG. 28 of a modified form of lateral seal; and

Figure 8:
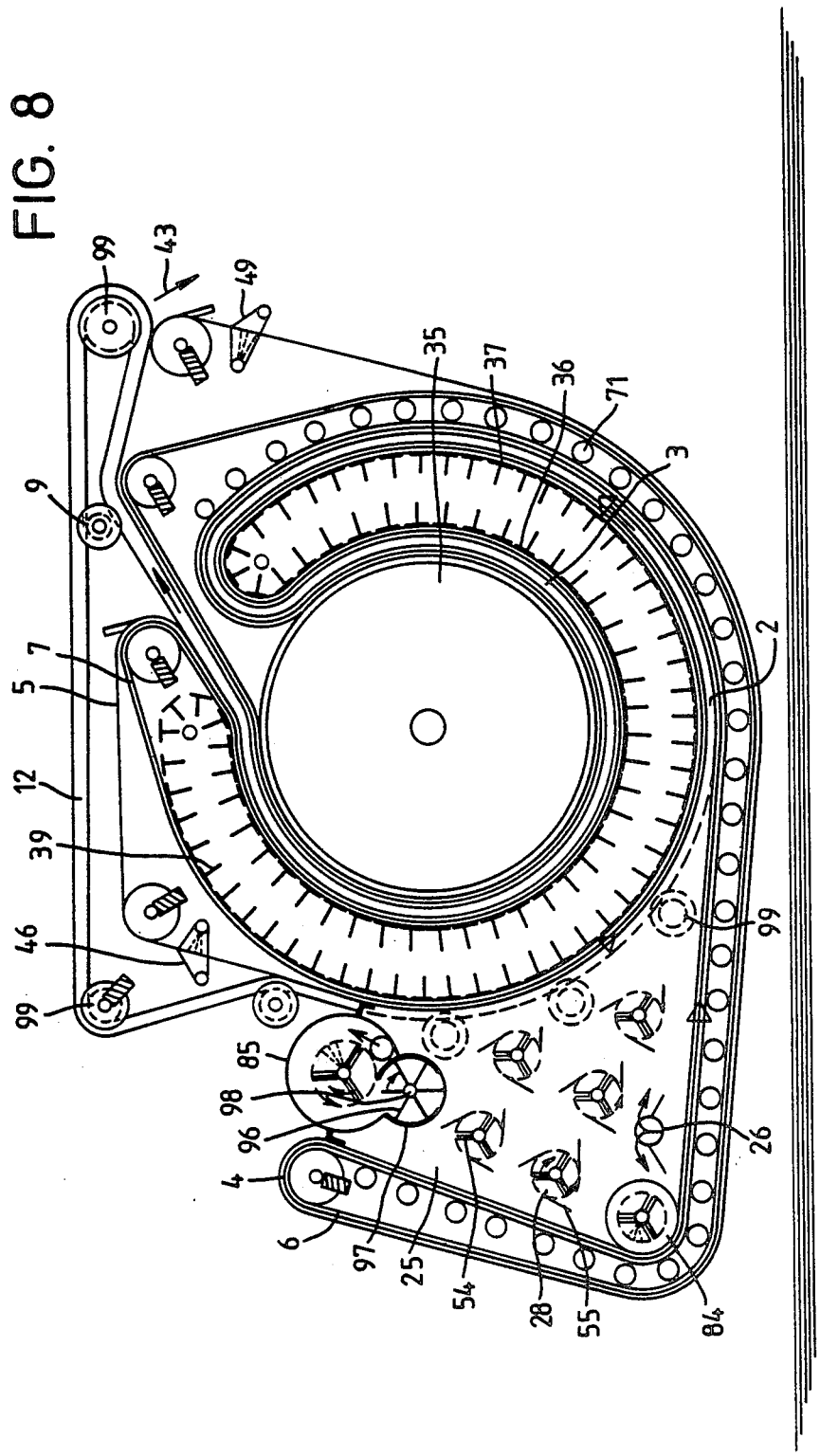
FIG. 8 shows a particularly preferred embodiment of the invention, likewise in a schematic simplified sectional side elevation.

FIG. 30 shows a detail of the embodiment shown in FIG. 8.

Figure 1:
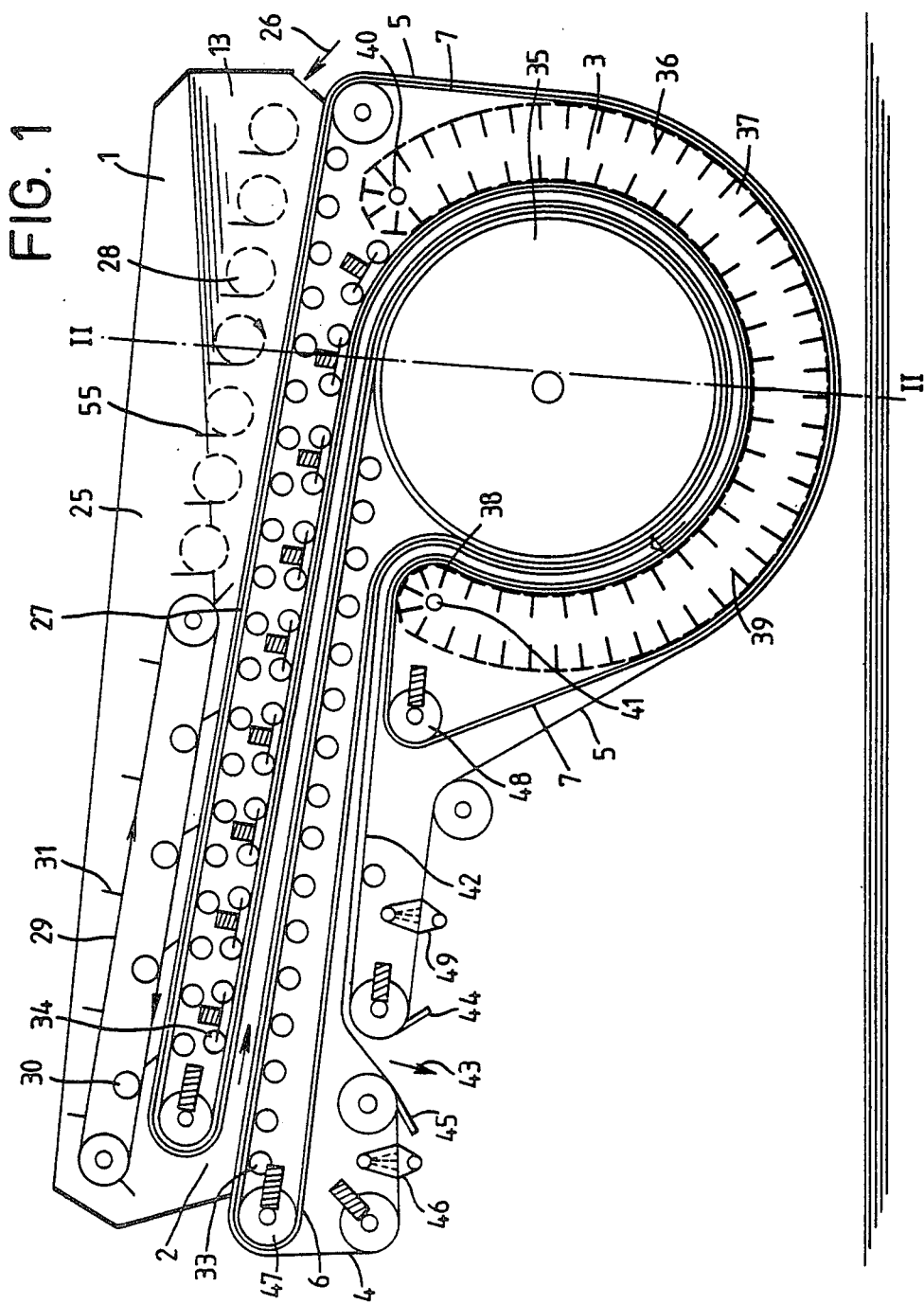
FIG. 1 is a simplified schematic sectional side elevation of a first embodiment of the invention.

The first embodiment of a chamber-filter press according to this invention shown in FIG. 1 preferably comprises three de-watering stages which differ from one another with regard to the basic pressure range applied to the substance under treatment. This stage comprise:—a low pressure or gravitational preliminary de-watering or drainage stage 1; a medium pressure de-water stage 2; amd a high pressure de-water stage 3.

A pair of filter bands 4,5 runs through the whole of the filter press, said filter bands being supported on carrier belts 6,7 which are arranged to move continuously with the filter bands 4,5.

Since the special construction of the filter bands 4,5 in combination with the carrier belts 6,7 is one of the characteristic features of this invention, this combination will be explained first of all with reference to FIG. 20, and FIGS. 25 to 29.

The carrier belts 6,7 are belts of plastic or rubber having comparatively high lateral rigidity. The belts 6,7 are provided on one side thereof, that which faces the sludge from which the water is to be pressed out, with open top channels 8,9 respectively. The channels of each belt are mutually parallel and are separated by corresponding respective strips of material 10,11 (see FIGS. 25 and 26). The filter bands 4,5 rest on these strips of material 10,11 and advance or move with the carrier belts 6,7 so that there is no relative movement between carrier belts and filter bands.

In the filter press according to this invention, the filter bands rest firmly supported on their carrier belts while they move with the latter. This special new feature makes it possible to provide the filter bands with lateral sealing means as shown, by way of example, in FIGS. 20, 28 and 29 and generally referenced 12.

Figure 20:
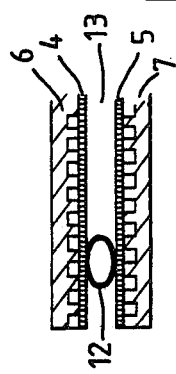
FIG. 20 is a sectional view of a detail of lateral sealing means.
Figure 21:
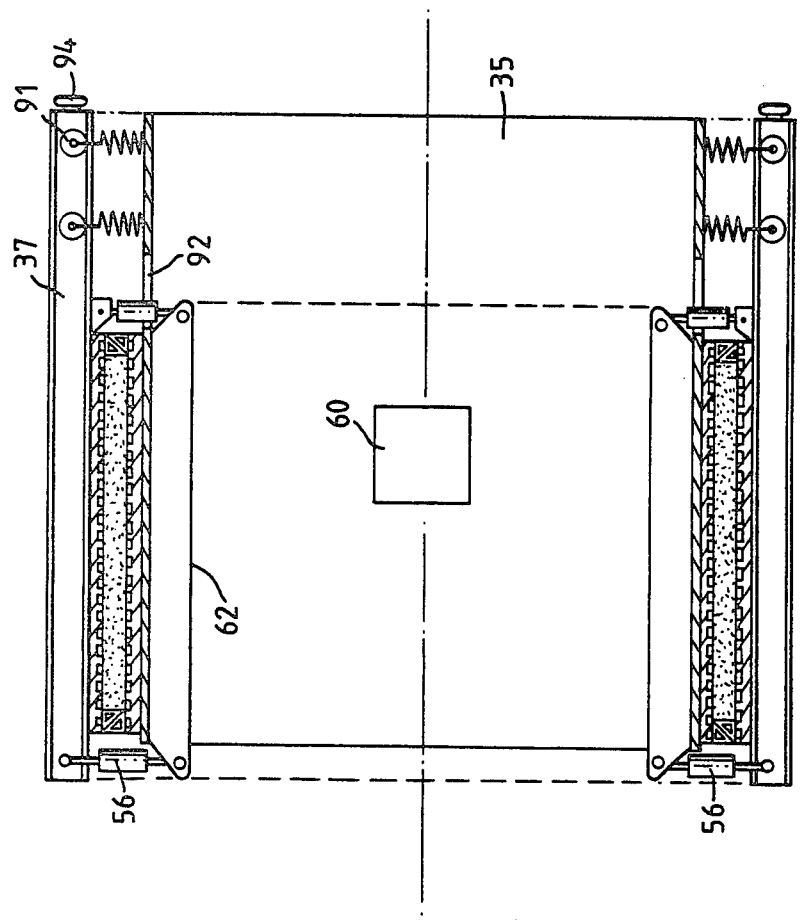
FIGS. 21 to 23 are cross sectional views depicting the sequence of movement in a modified embodiment of the invention.
Figure 22:
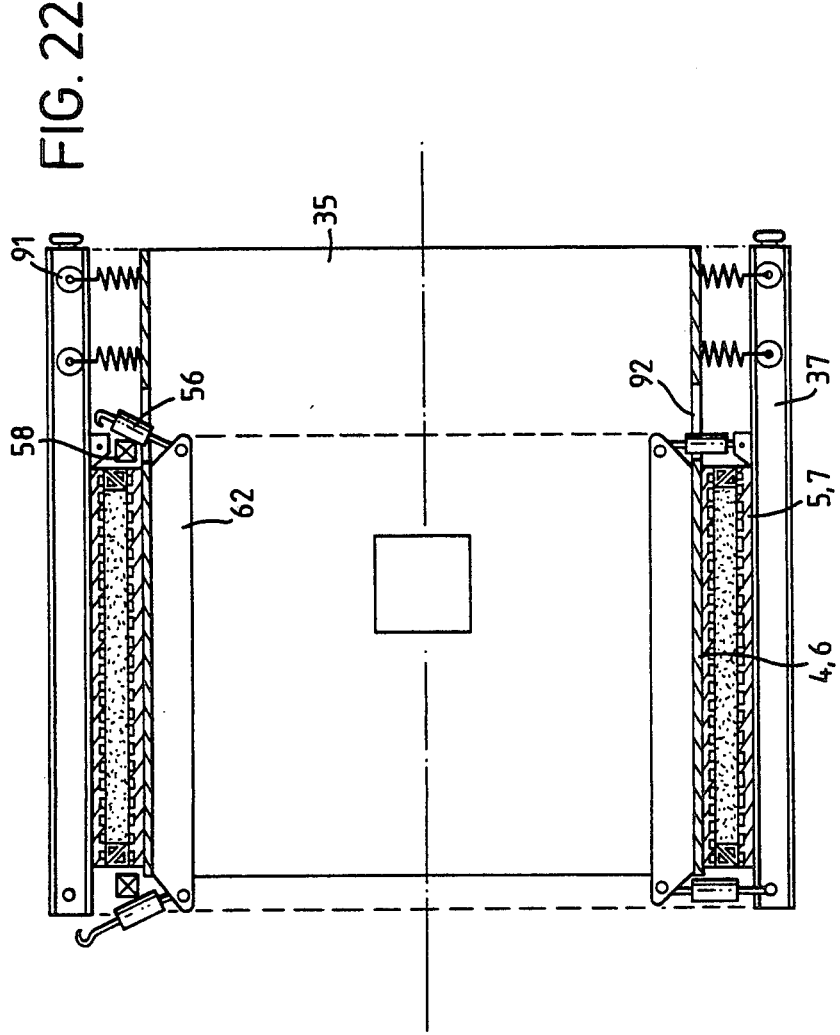
Figure 23:
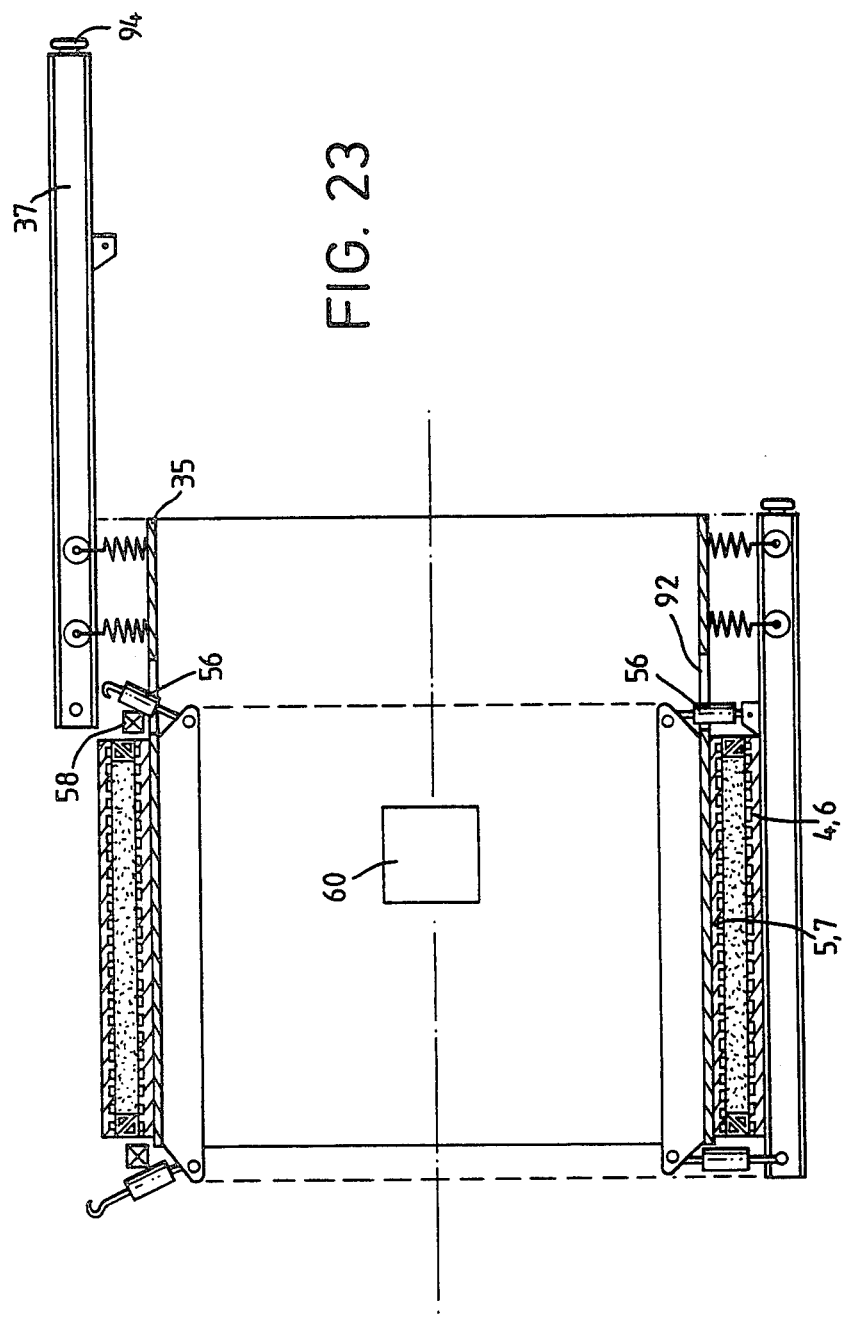

The sealing means 12 as shown in FIG. 20 comprise hollow bodies of rubber or like deformable material, which extend on both sides of the combined filter band and carrier belt assembly, and which are wholly independent of the filter bands 4,5. Such sealing means 12 may be a rubber tube or hose. The sealing means 12 in this arrangement can therefore follow and adapt to an alteration of relative distance between the filter bands 4,5 caused by increasing pressure and decreasing volume of the sludge generally referenced 13, for example, by changing from an initial circular cross-section to the oval cross-section as shown in FIG. 20.

The alternative sealing means 12 as shown in FIG. 28 are rubber strips 14,15 of triangular cross-section which are bonded or secured by adhesive to the longitudinal edges of the filter bands 4,5 respectively, the arrangement being such that the rubber strips or beads 14,15 interengage and jointly form the seal means 12. As shown, the rubber strips 14,15 are hollow so enabling deformation to change their shapes shown on the right hand side of FIG. 28 when there is a decreasing volume of sludge between the opposed filter bands 4,5 which reduces the space therebetween.

Figure 19:
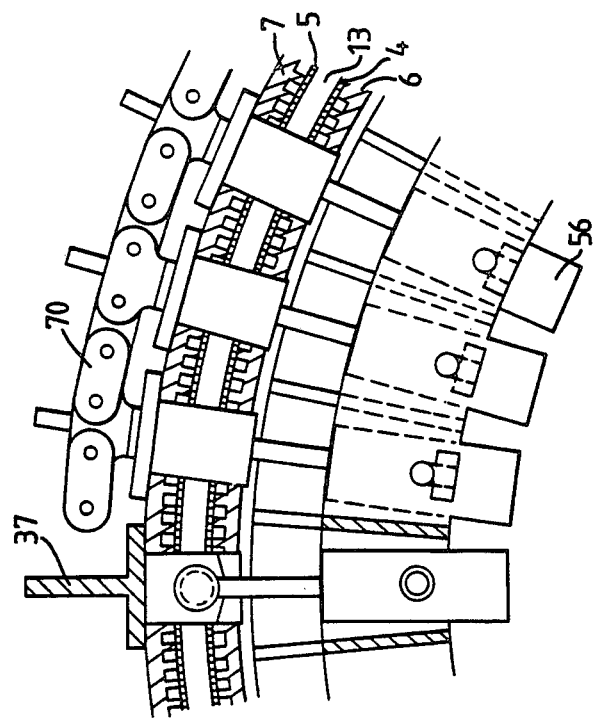
FIGS. 18 and 19 are views corresponding to those of FIGS. 15 and 16 but showing a modification of the pressure-generating part.

The other alternative sealing means 12 as shown in FIG. 19 also comprise hollow rubber strips or beads 16,17 of different but complementary crosssectional configurations. These act in a corresponding manner to the embodiment shown in and described with reference to FIG. 28.

FIGS. 28 and 29 depict and relate to another special feature of the present invention which is achieved because of the comparatively high degree of side rigidity of the carrier belts 6,7, the true or straight running of the combined assembly of carrier belts and filter bands throughout the press can be ensured by the simple expedient of providing idler rollers backing the carrier belts 6,7, one pair of such idler rollers 18,19 is illustrated in FIGS. 28 and 29. The idler rollers 18,19 are mounted or rotation between respective track rims 20,21, and these keep the carrier-belt/filter band combination assembly running true and straight. The track rims 20,21 may comprise rubber beads, flanges or washers.

Figure 26:
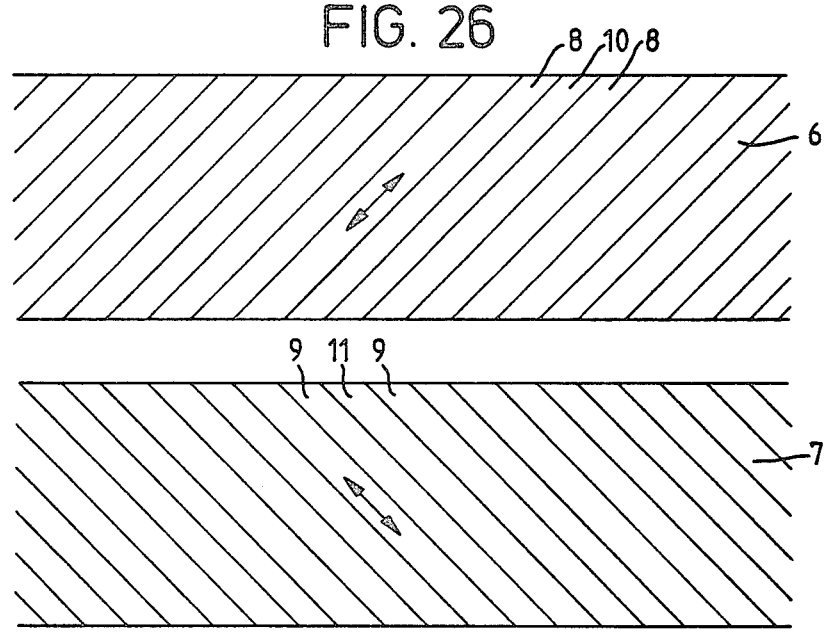
FIG. 26 depicts the disposition of the channels provided in the carrier belts.

FIG. 26 depicts the channels 8,9 which are provided in the carrier belts 6 and 7 and shows that the channels extend obliquely relative to the direction of advancement of the belts, an angle of 45° being preferred in both cases in order to ensure uniform dispersal and evacuation of water in all de-watering stages.

FIG. 27 shows the super-posed relationship of the carrier belts 6 and 7. As shown, the arrangement is such that in the preferred embodiment the axes channels 8,9 extend normally to one another, and the support strips 10,11 intersect one another at an angle of 90° which ensures that a sufficient number of supporting surfaces 22, shown in black in FIG. 27, are always available to take the pressure applied to the filter bands 4,5. Due to these provisions, the pressure which is applied to the sludge 13 under treatment cannot, expecially in the high pressure stage, force the filter bands 4,5 into the channels 8,9.

As will now be explained, in the apparatus all the continuous pressure stages have a gradient or inclination (preferably common) so that the water which is forced out of the sludge 13 through the filter bands 4,5 into channels 8,9 (see arrows 23,24 in FIG. 25) can be easily diverted and flow off laterally. Owing to the continuous application of pressure, the water which is pressed into the channels on the upper channel 8 (FIG. 25) cannot flow back into the treated sludge 13 but has to flow laterally in each channel 8 on the upper side of the filter band 4.

In the embodiment of the invention as shown in FIG. 1, the preliminary draining stage 1 includes a chamber 25 containing the sludge 13 which is to be de-watered. The base of the sludge chamber 25 comprises the carrier belt 7 and the filter band 5. The sludge or like substance is fed at 26 into the chamber 25 where it is first gravitionally de-watered by settlement in a first portion of the chamber 25 ending at the dotted line 27. The water emerging through the filter band 4 at the bottom of the sludge chamber 25 is laterally displaced through channels 8. In this drainage stage of the first portion of the sludge chamber 25, there are provided additional hollow filter bodies 28 which permit water removal.

In the sludge chamber 25, there is an adjoining second portion (to the left of the dotted line 27 in FIG. 1) wherein the pre-drained sludge is advanced further between the filter band 5 which advances with carrier belt 7 and a continuous driver band 29 arranged thereabove and supported on rollers 30 which enable the band 29 to apply a certain amount of pressure to the sludge 13. Since the whole bottom wall of the sludge chamber 25 consists of the carrier belt 7 and the filter band 5 which slope upwards in the direction of advancement, all water dispersed from the sludge along the whole of this distance is carried sideways and diverted through the channels on the upper side of the carrier belt. The driver belt 29 is studded with dogs, ribs or suitable entrainment elements 31 made of rubber or the like adapted to assist and transport the sludge 13 uphill in this region.

The partially de-watered sludge is transferred to the medium pressure stage 2 where the filter bands 4,5 with their respective associated carrier belts 6,7 are opposite and inclined to one another to define a wedge-shaped path. The lower combination of carrier belt 6 and filter band 4 as shown in FIG. 1 is supported on track-supporting rollers 33 while the upper combination of carrier belt 7 and filter band 5 is biassed towards the lower filter band 4 by spring-loaded sets of backing rollers 34. The roller sets 34 may serve to apply a certain amount of pressure of medium order of magnitude to the sludge travelling through the medium pressure stage 2 to assist and enhance the de-watering action.

FIG. 1 quite clearly shows that this medium pressure stage 2 is inclined to present a gradient which is the same as that of the gravitational pre-de-watering stage 1. Again, the water which is squeezed out of the sludge through the filter bands 4,5 can be safely conducted away in a lateral direction through channels 8,9.

The medium pressure stage 2 is followed by the adjoining high pressure stage 3 which comprises a continuous chamber-type filter press. This high pressure stage starts directly after the last roller set 34 at the narrower end of the wedge shaped path of the medium pressure stage 2.

In the high pressure stage 3, both filter bands 4 and 5 with associated carrier belts 6 and 7 mount a drum 35 of large diameter having a smooth exterior wall. Additionally, the outermost carrier belt 7 is mounted on an armour belt 36. The drum 35 rotates in the same sense as the direction of advancement of the filter bands 4 and 5, and the section of the armour belt 36 adjacent the drum is also arranged to advance in the same sense. The armour belt 36 consists of mutually articulated T-sections 37 which span the entire width of drum and carrier belt.

The T-sections 37 of the armour belt are adapted to be coupled, i.e. drivingly engaged, with high pressure producing devices on both lateral edges of the drum, (to be described later) and which are controlled in such a way as to pull or urge the T-sections 37 towards the drum centre. The pressure thereby applied is increased, either in stages or continuously by appropriate control of the high pressure devices, up to position 38 where the armour belt 36 runs off the drum 35 to return along an idle return run 39. The armour belt 35 is mounted for continuous advancement on two axles 40,41. The drive for the whole armoured track section covered by filter bands 4,5 and carrier belts 6,7 may be obtained either by providing one of the two axles 40,41 with positive drive or by driving the drum 35. After having passed position 38 the filter bands 4,5 with the de-watered sludge therebetween, run on their carrier belts along a substantially horizontal path 42 to a delivery station 43 where the de-watered sludge, now in the form of cake is removed from the filter bands by strippers 44,45.

From the delivery station 43, the filter band 4 travels through a rinsing chamber 46, and then back to the medium pressure stage 2 where it is re-engaged with its carrier belt 6 by means of a spring-loaded deflector pulley 47. Carrier belt 7 is redirected by another spring-loaded deflector or return pulley 48 immediately behind position 38 and returned jointly with filter band 5 along the idle return run 39 of the armour belt 36 to the preliminary drainage stage 1. The filter band 5 first passes through the horizontal path 42, the delivery station 43 and another rinsing chamber 49.

Figure 2:
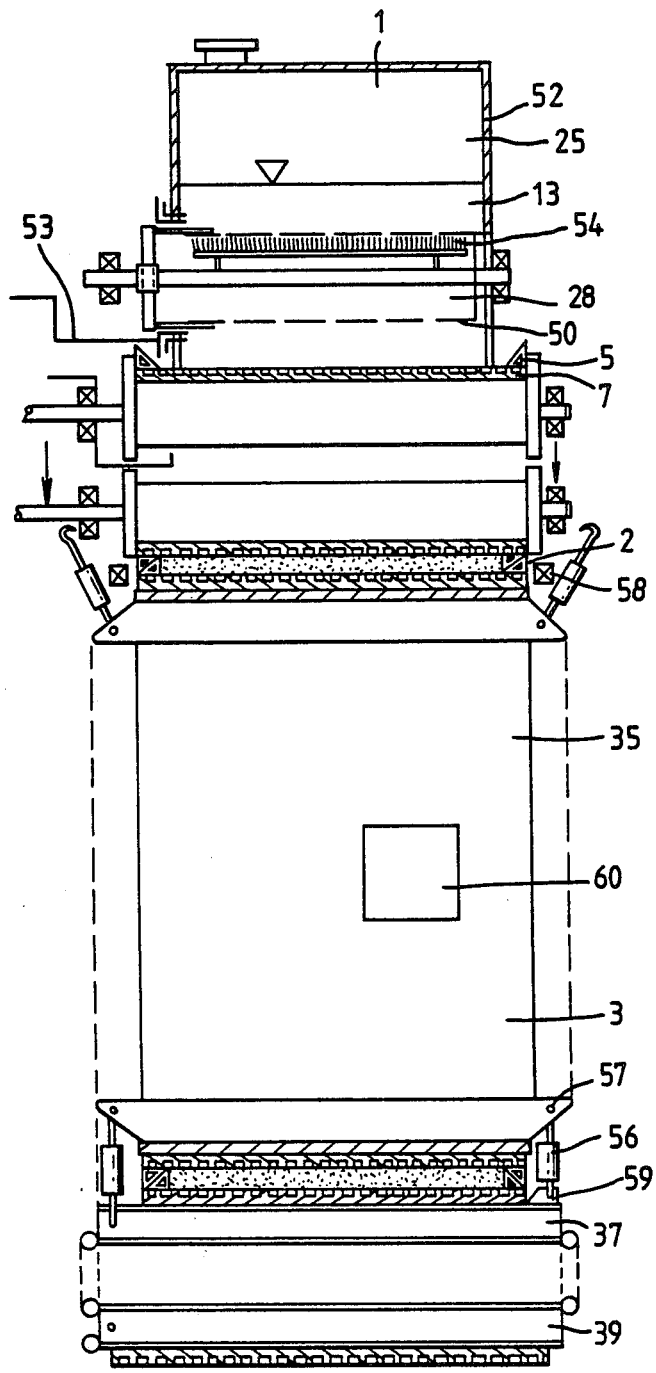
FIG. 2 is a section taken on line II—II of FIG. 1.

Further details of the embodiment shown in FIG. 1 are depicted in FIG. 2. The filter elements 28 provided in the sludge chamber 25 are wholly or partially submerged in the sludge 13, and are cylindrical. They comprise a drum 50 made of filter material and are supported in bearings provided in the side walls 51,52 of the sludge chamber, the water which is picked up by the filter element 28 from the wet sludge 13 is displaced laterally at 53.

In a modification of the external strippers for the filter elements 28 shown in FIG. 1, FIG. 2 shows a preferred form of execution where one or more brush elements 54 are provided internally of the filter elements 28. The brush elements may be rotated relative to stationary filter bodies, or stationary relative to rotated filter bodies, or both the brushes and filter bodies may be counter-rotated. Such brush elements sweep off the sludge particles which tend to adhere to the filter material of the filter elements 28 so that these will not clog up with sludge solids. Furthermore, the bristles of the brush elements 24 which penetrate through the holes in the filter material will impart a slight shock or push to the sludge particles and this actively assists the discharge of water into the interior of the filter element 28.

FIG. 2 further shows, in a schematic fashion, details of the high pressure stage. As shown, the drum 35 carries along both peripheral edges, a plurality of spaced apart high pressure producing devices 56, the spacing ratio corresponds to the spacing ratio of the T-sections 37. These devices 56 comprise a plurality of hydraulic rams or cylinders which are each pivotally mounted in bearings 57. As shown along the upper half of drum 35 in FIG. 2, these cylinders, in pressure relieved condition, are pivoted by a controlling cam 58 out of engagement with the coupling elements 59 which are provided on the T-sections 37. The hydraulic system, is described later with reference to FIG. 7, and is here diagrammatically represented and designated 60. The hydraulic system rotates with the drum 35 and the whole system including control means and a hydraulic pump is connected to the drum 35 so that the hydraulic cylinders 56 can be connected to hoses fixed inside the drum.

The operation of the hydraulic cylinders to apply pressure to the sludge 13 between the filter bands 4,5 and carrier belts 6,7 by drawing the T-sections towards the drum, is controlled in such a way that the pressure increases, either continuously or by steps during drum rotation.

FIG. 2 further shows in the lower half, that for the lower portion of the drum where high pressure is applied, two hydraulic cylinders 56 and one T-section 37 together form a single mechanical means so that the magnitude of effective de-watering pressure is limited only by the mechanical strength of these parts, there being no relative movement between filter bands, carrier belts and the pressure surfaces applied.

This is in direct contrast with the prior art, and no limitation regarding potentially applicable pressure arises from friction between the parts involved. It is also evident that due to increasing pressure, the cross-sectional dimensions of the filter chamber defined by the lateral sealing means 12, the filter bands 4,5 with carrier belts 6,7 and the restrictive effect in front and behind of the treated sludge 13 itself, must be continuously reduced with progressive de-watering. In contrast with conventional chambertype filter presses, pressure can be increased so that the ultimate achievement of much higher solids percentages at minimum energy consumption can now be obtained.

Before referring to further embodiments of the invention, reference will now be made to FIGS. 15 to 19 in order to explain the constructional details and operational control of the high pressure producing devices, or hydraulic cylinders 56 provided on the drum 35.

In the arrangement shown in FIG. 2, the cylinders 56 are spring-loaded in such a way as to urge into their operatively engaged or coupled position and, in pressure relieved condition, are pushed by the control cam 58 out of engagement with the coupling elements 59 on the T-sections 37. FIGS. 15 and 16 show a modified arrangement wherein each hydraulic cylinder 56 is mounted in a bearing 63 on an extension 61 of a support 62 extending through the drum 35 into the interior, and mounted in such a way as to be pivotal out of the drum 35. The upper piston rod of the cylinder 56 is equipped with a coupling part 64. Referring back to FIG. 1, it can be noted that the control system for the hydraulic circuit 60 will relieve cylinder 56 of pressure shortly prior to its arrival at position 38 so that a control cam (depicted in detail in FIG. 17) is engaged by a lower cam follower 65 provided on the hydraulic cylinder 56. When the cylinder 56 arrives at this position it will engage the initial inclined portion 66 of the control cam 58 which causes the cylinder to pivot into the position shown in dotted lines in FIG. 15, i.e. out of engagement with coupling part 59 of the T-section 37. The hydraulic cylinders 56 remain relieved over that part of their revolution with the drum 35 which is defined between positions 38 and 40, and their associated followers 65 run along region 67 of the control cam 58 which on both sides is parallel to the drum edge, and the cylinders are relieved during this phase. Approximately at position 40 in FIG. 1, the cam-followers 65 enter inclined portion 67 of the control cam 58 whereby they are pivoted back from the position shown in dotted lines in FIG. 15 into the engaged, operatively coupled position wherein the coupling parts 59 and 64 engage with one another. On, or after, entering part 69 of the control cam 58 which is once more parallel with the drum edges, the cylinders 56 may once more be pressurised and begin to draw their associated T-sections 37 towards the support 62 on the drum 35.

FIG. 16 depicts details of FIG. 15 in side elevation to show that the T-sections 37 of the armour belt 36 are mutually connected by roller link chains 70 provided on either side thereof, and that the spacing ratio of said roller chains 70 and the T-sections 37 is at least 1:3. This ensures that the minor alteration which occurs during revolution about the drum 35 in the distance between filter bands 4 and 5 and carrier belts 6 and 7, and which alters the radius about which the roller chains 70 revolve, can be accommodated by the roller chains 70 and these will not become rigid, but merely sag or slacken a little between successive T-sections 37. It must be remembered that the T-sections 37 themselves are maintained absolutely rigid owing to the pressure applied by the hydraulic rams 56 and cannot therefore yield to compensate for radius variations of this kind.

FIG. 15 also shows the detail of the aforementioned track-holding rims 20 for true running of the carrier belts 6,7.

Figure 18:
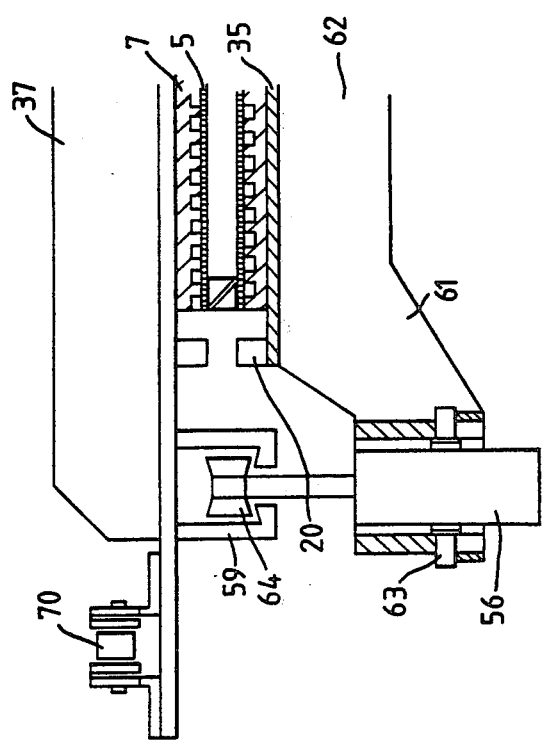

FIGS. 18 and 19 correspond respectively to FIGS. 15 and 16 but show a modified coupling system which does not require special deflection of the cylinders 56 for their disengagement or re-engagement with the supports. As shown in these figures, the pivot axes 63 of the cylinders 56 extend transversely of the lateral drum edges and are designed merely to compensate for minor displacements. The coupling parts 59 and 64 are designed in such a way that they will automatically disengage when the cylinder 56 is relieved at position 38 and will be equally automatically re-engaged at position 40 by means of oppositely directed curvature of their respective tracks.

A brief explanation will now be given of the variations of this invention shown in the following Figures of the drawings while, with regard to constructional details, the foregoing description of the arrangement shown in FIGS. 1 and 2 must be appreciated.

Figure 3:
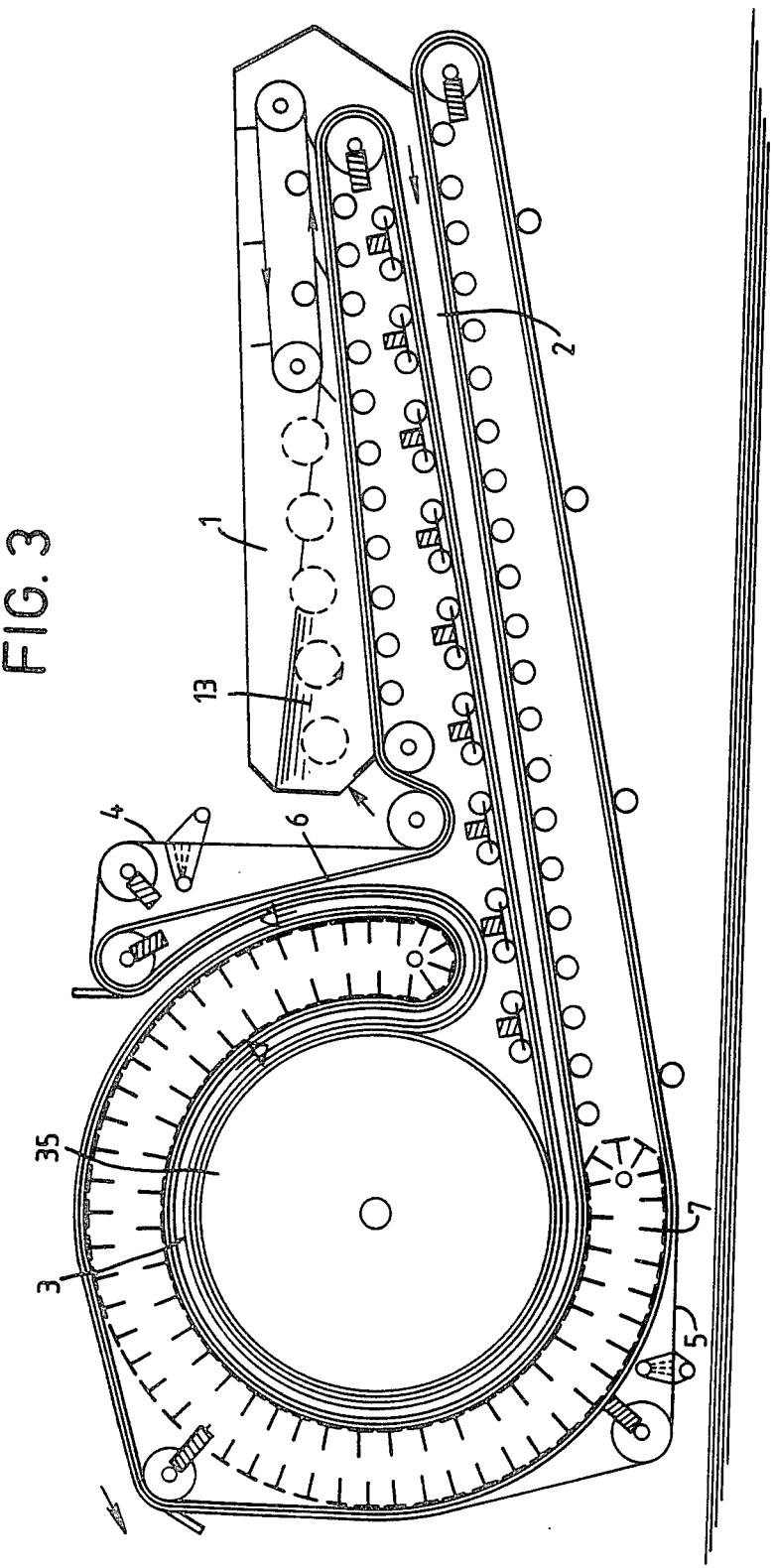
FIG. 3 is a simplified schematic sectional side elevation of another embodiment of the invention.

FIG. 3 shows an embodiment of the invention wherein the preliminary drainage stage 1 is arranged laterally beside the high pressure stage 3. The advantage of this arrangement is that it provides a longer high pressure zone for the continuous high pressure stage 3. This will be readily observed by comparing the drawings.

Figure 4:
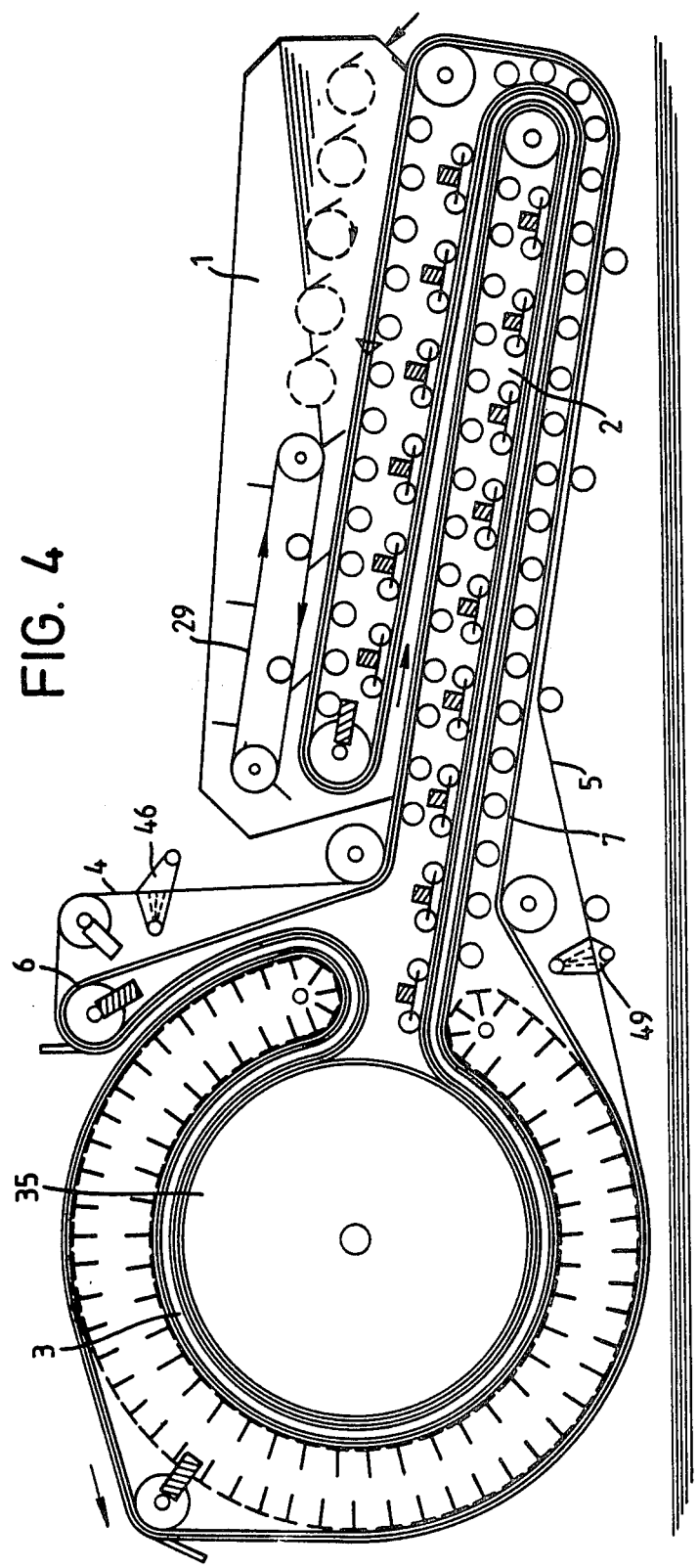
FIG. 4 is a schematic simplified sectional side elevation of a further embodiment of this invention.

A further improvement on this aspect is achieved with the arrangement shown in FIG. 4 which additionally, and without increasing the overall length of the apparatus, enables the medium pressure stage 2 to be duplicated whereby substantially higher solids percentages can be obtained.

Figure 5:
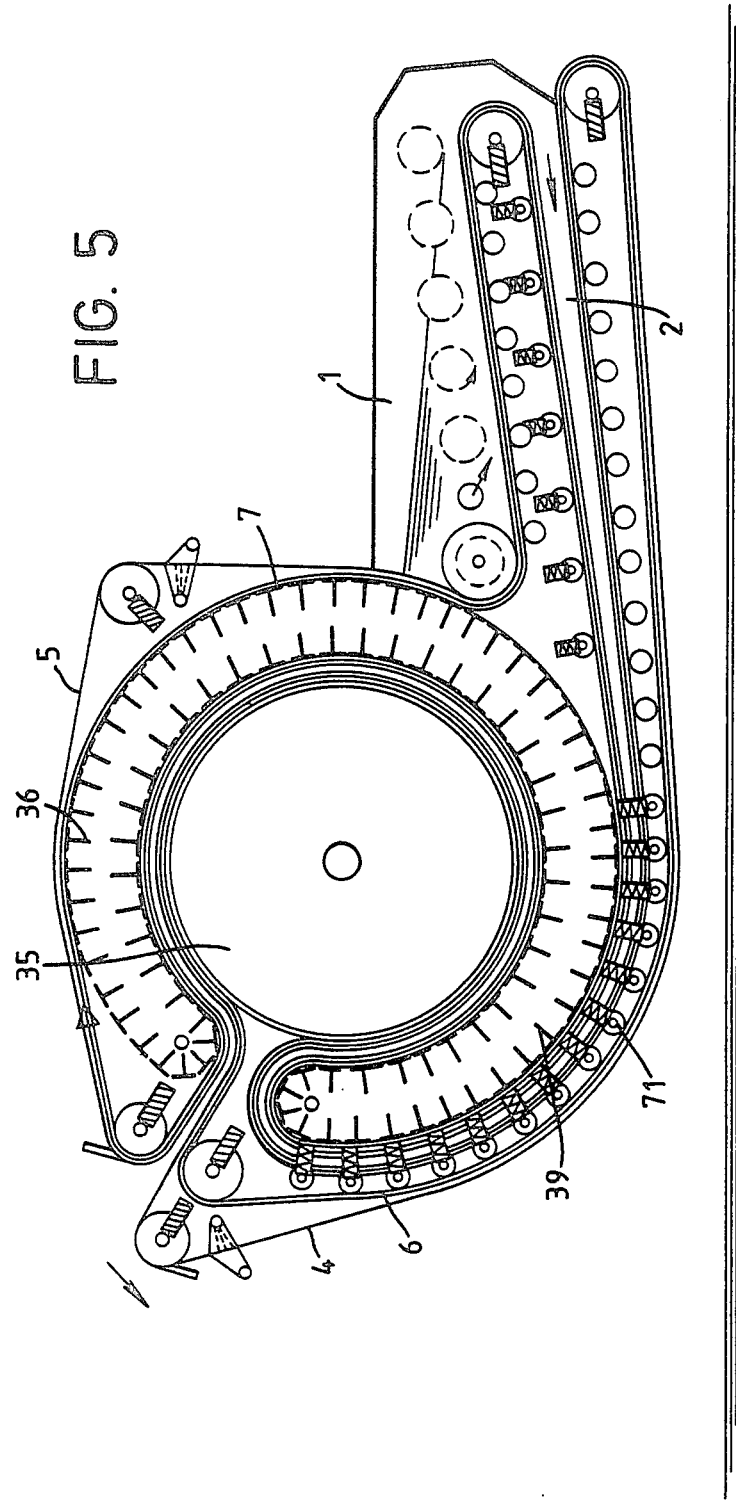
FIG. 5 is a schematic simplified sectional side elevation of a fourth embodiment of the invention.

FIG. 5 shows a simplified arrangement in comparison with FIG. 4. This is a substantially more compact design which is arrived at in this case by providing the medium pressure stage 2 around a portion of the return run 39 of the armour belt 36 so that a portion of the return run of this belt works as a co-revolving backing or supporting surface for the carrier belt 6 or 7 of the medium pressure stage 2. To do this, track rails of approximately quadrant form are provided on both sides of the apparatus for the roller chain 70 of the return run to support the latter, said rails providing at the same time a counter-support for rollers 71 which are biassed in towards the centre of the drum 35.

It should be mentioned at this point of the description that here, as in all other previously described embodiments of the invention, no tensile stress whatsoever is applied to the belts or bands for producing the operative pressure, and there is no friction between parts which are subject to pressure, apart from the rolling friction associated with the rolling of the supporting or backing rollers along the plain rear sides of the carrier belts 6,7. Therefore, friction does not impose any limit on the magnitude of controlling pressures.

Figure 6:
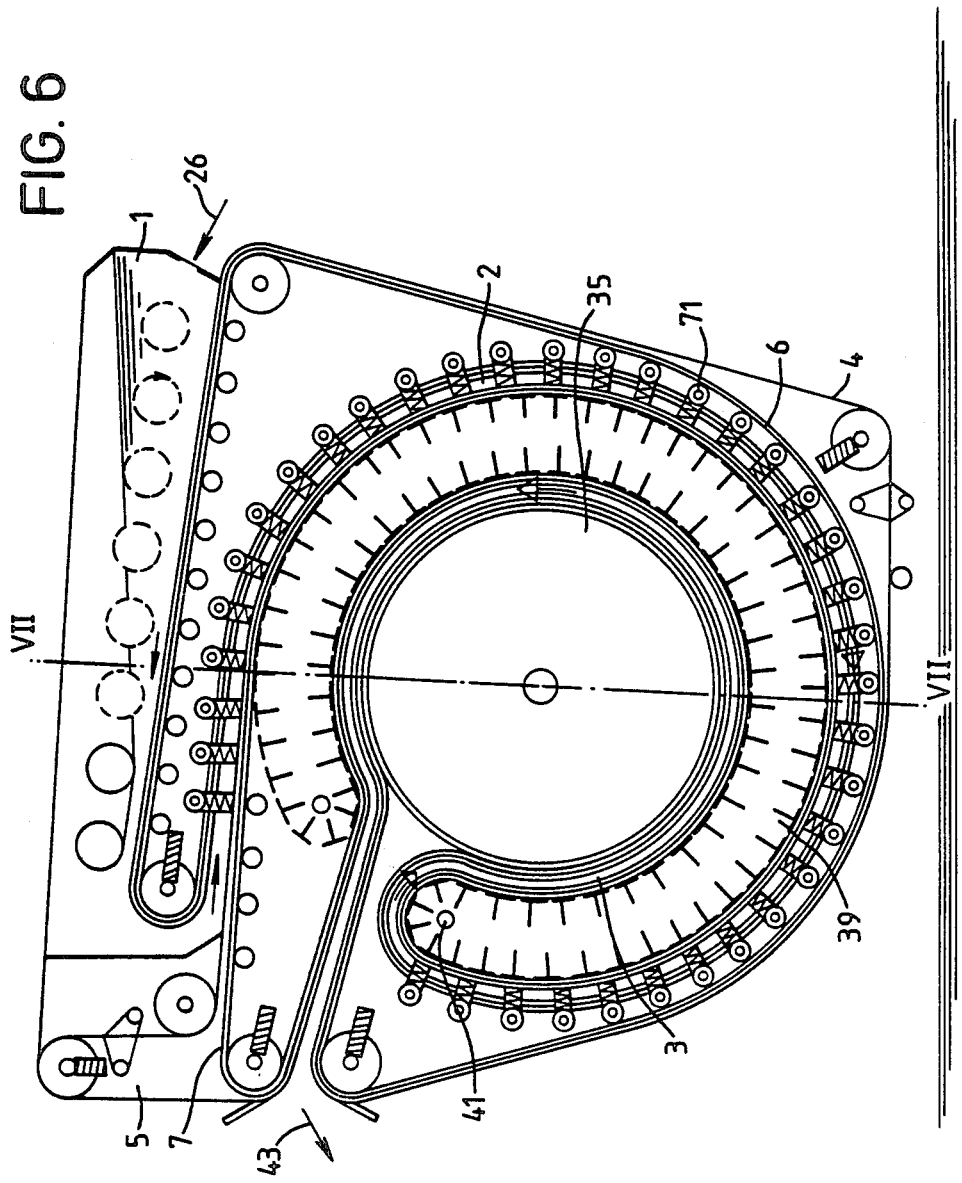
FIG. 6 is a schematic simplified sectional side elevation of a fifth embodiment of the invention.

FIG. 6 shows an even more compact filter press according to this invention wherein almost the entire return run 39 of the armour belt 36 is adapted to support the medium pressure stage 2.

Figure 7:
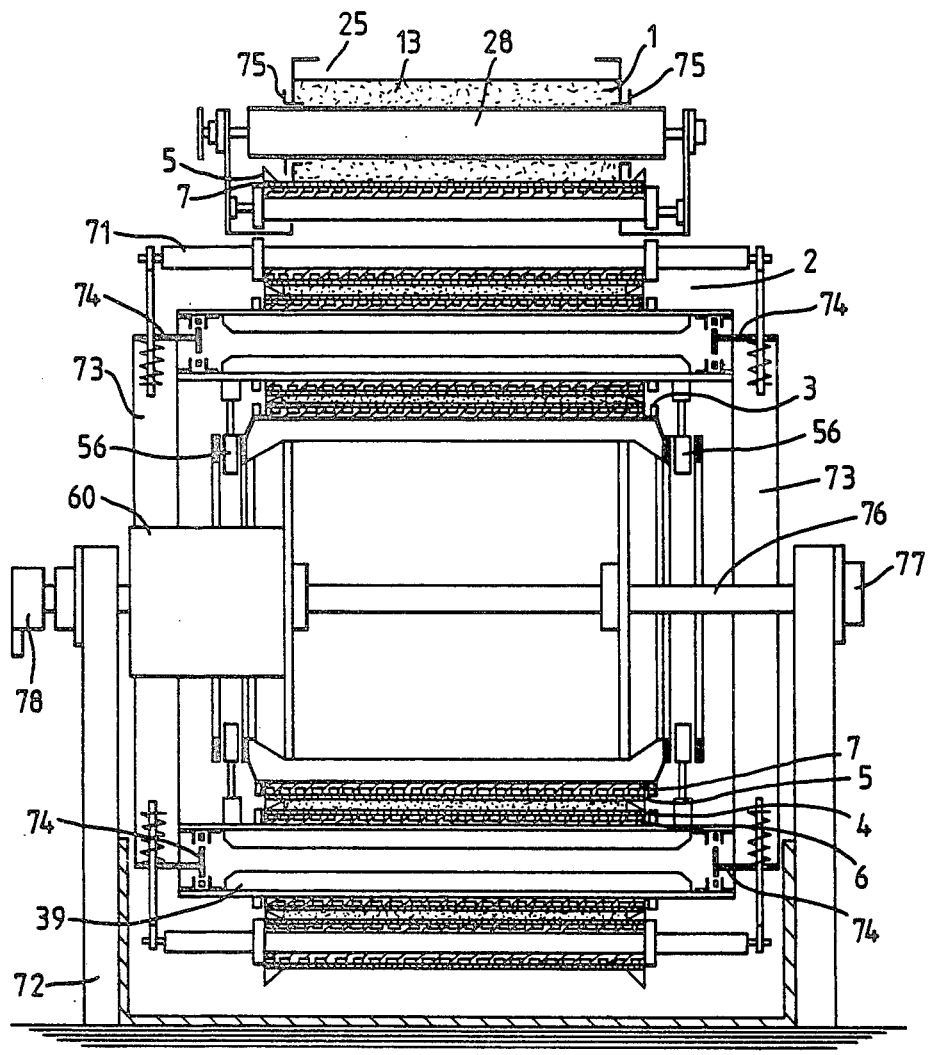
FIG. 7 is a section taken on line VII—VII of FIG. 6.

Details of the embodiment according to FIG. 6 are shown in section in FIG. 7. As will be seen from FIG. 7 the press as a whole may be mounted in an extremely simple frame structure 72 which comprises upright supports 73 providing an annular guideway 74 for the rollers of the roller chain 70 of the armour belt 36. In respect of the medium pressure stage 2, the annular guideway 74 provides the counter-support for the return run 39, and the latter performs the additional function of a supporting surface for the medium pressure stage 2. The annular guideway also serves as a bearing for the pressure rollers 71 of the medium pressure stage.

The upper half of FIG. 7 also shows sectional details of the preliminary drainage stage 1 in which carrier belts and filter bands 5,7 form the bottom wall of the sludge chamber 25. The filter element 38 is sealed on both sides thereof in the housing walls of the sludge chamber 25 by gaskets 75 so that the water which is removed from the sludge in this preliminary drainage stage is diverted laterally on both sides. All drives can be derived from a single motor by appropriate transmissions. FIG. 7 further shows the drum shaft 76 mounted at both ends in the frame 72 which, in the illustrated example, also mounts the drive 77 and the hydraulic unit 60 which rotates with the drum.

The electrical supply to the pump of the hydraulic unit 60 is through slip rings 78 so that all the connections from the hydraulic unit 60 to the hydraulic cylinders along both drum edges may be made be fixed lines. The hydraulic rams 56 are controlled by means of a control unit also provided in the hydraulic system and co-rotating with the drum 35. This control unit is not shown nor specifically described because it can be of any suitable kind known in hydraulic engineering.

FIG. 8 shows a particularly preferred embodiment of the invention which differs from the other emboiments primarily with regard to the design of the sludge chamber 25 in the primary draining stage 1.

As shown, the sludge chamber 25 comprises an inlet 26 for the sludge, the sludge having been previously flocculated by suitable agents. The pre-treated sludge is introduced very gently into the chamber 25 without destruction of particle sizes by a pump (not shown). One of the filter elements 28 may be adapted to function as a mixer drum for mixing a flocculating agent and sludge, and this avoids providing auxiliary equipment since the sludge chamber 25 is quite big enough for this purpose. The bottom and the left end walls of the sludge chamber 25, are formed by the combination of carrier belt 6 and filter band 4, whereas the right hand end wall is provided by filter band 5 on its carrier belt, here carried on the return run 39 of the armour belt 36. It will be obvious that with such an arrangement, the defining walls of the sludge chamber 25 are predominantly provided by parts of moving filter material which means that a very considerable filter surface area is readily available.

In the embodiment according to FIG. 8, and referring for details depicted in the sectional view of FIG. 30, it will be seen that the top of the sludge chamber 25 is sealed, and a device 85 is provided wherein the rinsing water discharged by the rinsing station 46,49 is processed. FIG. 8 shows quite clearly how the used rinsing water enters gravitionally into the processor device 85 where it is purified by a filter element which corresponds in its constructional details to the earlier described filter elements 28, whilst the residual sludge is conducted into the sludge chamber 25.

In view of the fact that, for reasons which are more specifically explained later, the wet sludge substance in sludge chamber 25 is subjected to a pressure which is preferably produced by the pressure created by the pump itself, the processor device 85 is connected to a pressure or flood gate 96 consisting of a rotationally driven star-shaped rotor element 97 in a housing 98. The arrangement is such that the inlet to the sludge chamber 25 is constantly closed relative to the return flow of rinsing water since the latter can only gravitationally enter into the processor device 85.

The embodiment of the invention which is shown in FIG. 8 is particularly preferred because here the sludge or similar wet substance is de-watered in a fully closed system. Since the sludge chamber is shut off against any filtrate return flow by the flood gate 96 whilst being closed in the direction of flow of the sludge by the lateral sealing means 12 and the medium pressure stage 2, it is possible to achieve maximum utilisation of sludge pump delivery pressure for intensive efficacy of water expulsion in the preliminary drainage stage. This is a vital factor for the total through-put of the plant in as much as it enables a substantial volume reduction in the treated substances at this very early stage. However, the intensity of water expulsion at this preliminary stage depends vitally on the pressure which is applied in this stage. It is obvious that a sludge chamber 25 of the kind shown in FIG. 8 provides considerable filter surface areas so that by limiting pumping pressure, for purely economical and practical considerations, to approximately 1 kg/cm$^2$ at the junction with the medium pressure stage 2, it is possible to achieve at this stage already a significantly higher solids percentage rate and high sludge through-put rates.

FIG. 8 also shows that in this embodiment of the invention the lateral sealing means 12 are of the kind shown in FIG. 20. These hose-like sealing means, which may also be filled with compressed air for longer service life, and may be provided with suitable valves for topping up, are guided by appropriately designed guide rollers 99 (see FIG. 30). Such guiding permits them to pass along the outside of the sludge chamber 25 in the first stage, and it is only at the junction between sludge chamber 25 and medium pressure stage 2 of the chamber-type filter press that they are inserted between the mutually opposite filter bands 4,5. Details of further guide means for the lateral sealing means 12 will be noted from FIG. 8.

Figure 9:
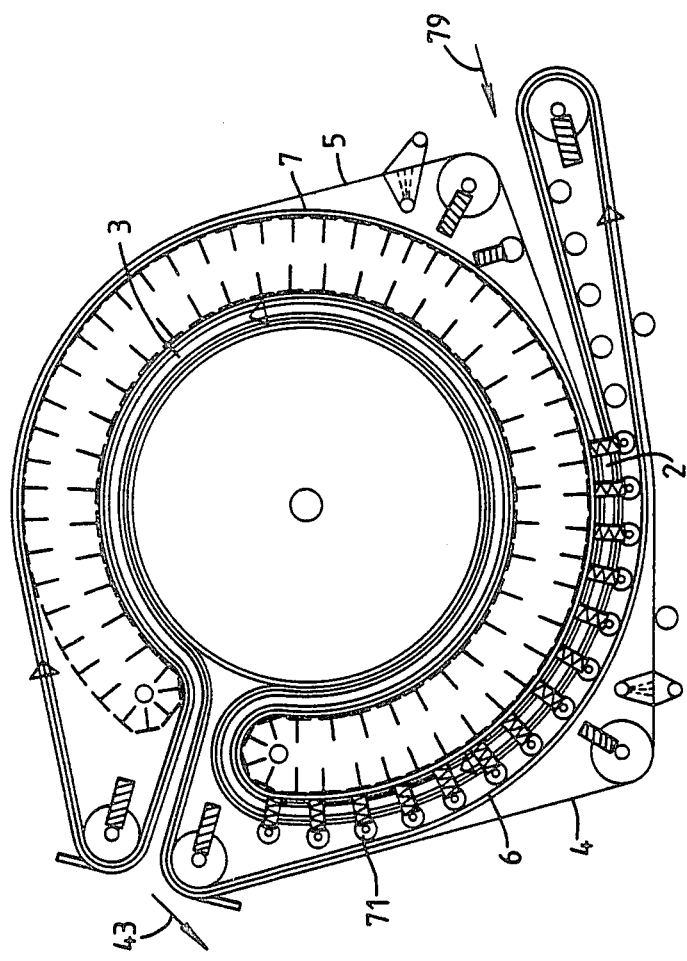
FIG. 9 illustrates a sixth embodiment of the invention in schematic simplified sectional side elevation, and depicting a high pressure stage preceded by a brief medium pressure stage, these being according to the previously shown embodiments, and this embodiment is designed for the treatment of pre-drained sludges.

FIG. 9 shows an embodiment of the invention which could be called an isolated continuously working chamber-type filter press, and which would be used more especially for further de-watering by high pressure application to already pre-dewatered sludges introduced at 79.

Figure 10:
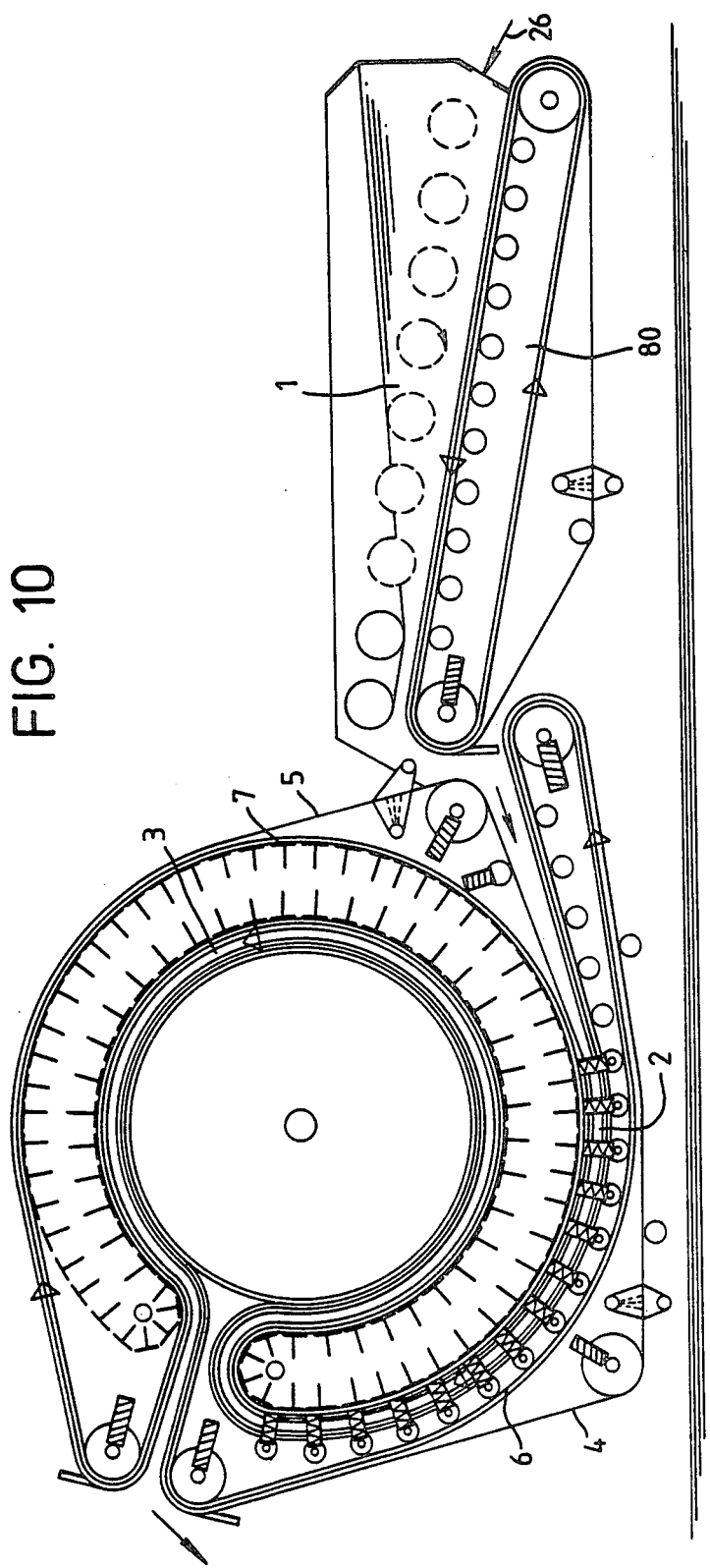
FIG. 10 is another sectional side elevation of the embodiment according to FIG. 9 but depicting a preceding or preliminary drainage or de-watering stage.

FIG. 10 illustrates a de-watering device, generally indicated at 80, which comprises a preliminary gravity drainage stage 1, and which could be of any conventional design and construction.

Figure 11:
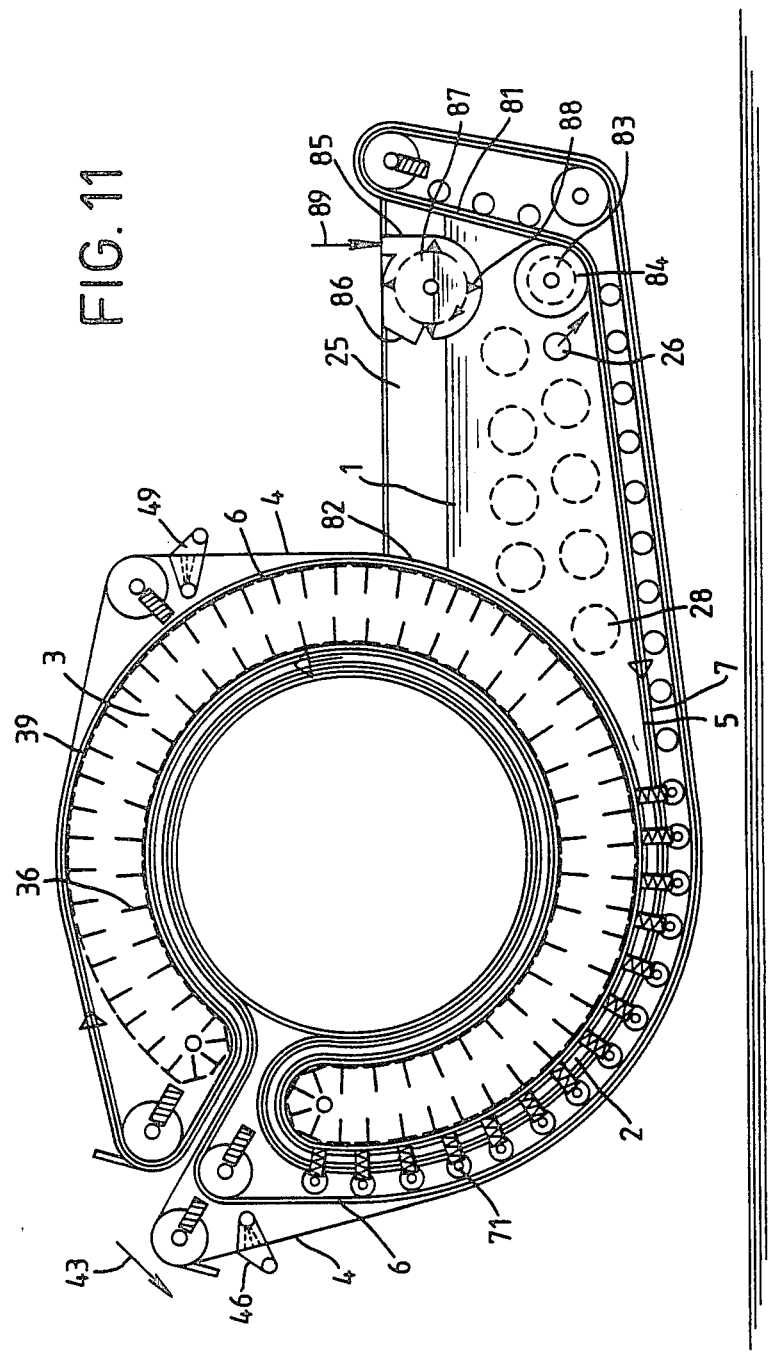
FIG. 11 is a schematic simplified sectional side elevation of a seventh embodiment of the invention.

FIG. 11 shows an embodiment of the invention wherein the medium pressure stage 2 is shortened by comparison with the arrangement according to FIG. 6, but wherein a particularly effective preliminary drainage stage 1 is provided.

This pre-draining stage 1 again comprises a sludge chamber 25 with sludge inlet 26 through which the flocculated sludge is fed into the chamber 25 in a particularly gentle and non-destructive manner preserving its particle size by means of a sludge pump (not shown). Again the bottom wall of sludge chamber 25 is provided by the revolving filter band 5 with associated carrier belt 7 which in the particularly efficient arrangement according to FIG. 11 also form the rear wall 81 of the sludge chamber 25. At the same time the frontal wall of considerable size of chamber 25 is formed by filter band 4 with carrier belt 6 which are returned on the idler run 39 of the armour belt 36 so that the whole of the sludge chamber 25, except for its side walls and the cover, consists of moving filter bands providing a filter surface area of considerable size along which the emerging water is passed out or diverted laterally through the channels 8,9 in the carrier belts 6,7. Filter elements 28 of the earlier described type may additionally be provided submerged in the sludge chamber 25.

In the interior of the sludge chamber 25, the filter band 5 with carrier belt 7 are conducted around a guide pulley 83 of a special design which may either be a filter element 28 provided with relatively spaced apart belt-supporting rubber discs 84, or an axle carrying rubber discs 84.

FIG. 11 also shows a device 85 for processing and cleaning the solid filtrate and/or rinsing water discharged in the rinsing stations 46,49 for the filter bands 4,5.

The processor device 85 comprises a housing 86 which is completely sealed relative to the sludge chamber except for an outlet, and extends over the full width of the sludge chamber, being secured in a sealed manner to the side walls of the latter. The housing 86 contains a rotatable filter element 87 of similar design to the filter elements 28, however, the external wall of this filter element 87 carries sealing blades or scrapers 88 extending over the full width and extending sealingly along the lower part of the housing wall. The scrapers 88 are relatively spaced apart by such a distance that the inlet 89 of housing 86 is at all times separated by the scrapers 88 from the outlet.

The dirty filtrate or rinsing water is introduced into the housing 86 through inlet 89 and the water content passed laterally out of the housing through the interior of the filter element 87 similarly as described in connection with the filter elements 28. The sludge particles which are left behind are delivered through the outlet into the sludge chamber 25. An elastic sludge stripper (not shown) may be additionally provided to ensure that all sludge particles adhering to the filter material of the filter element are properly stripped off and returned to the sludge chamber 25.

Figure 12:
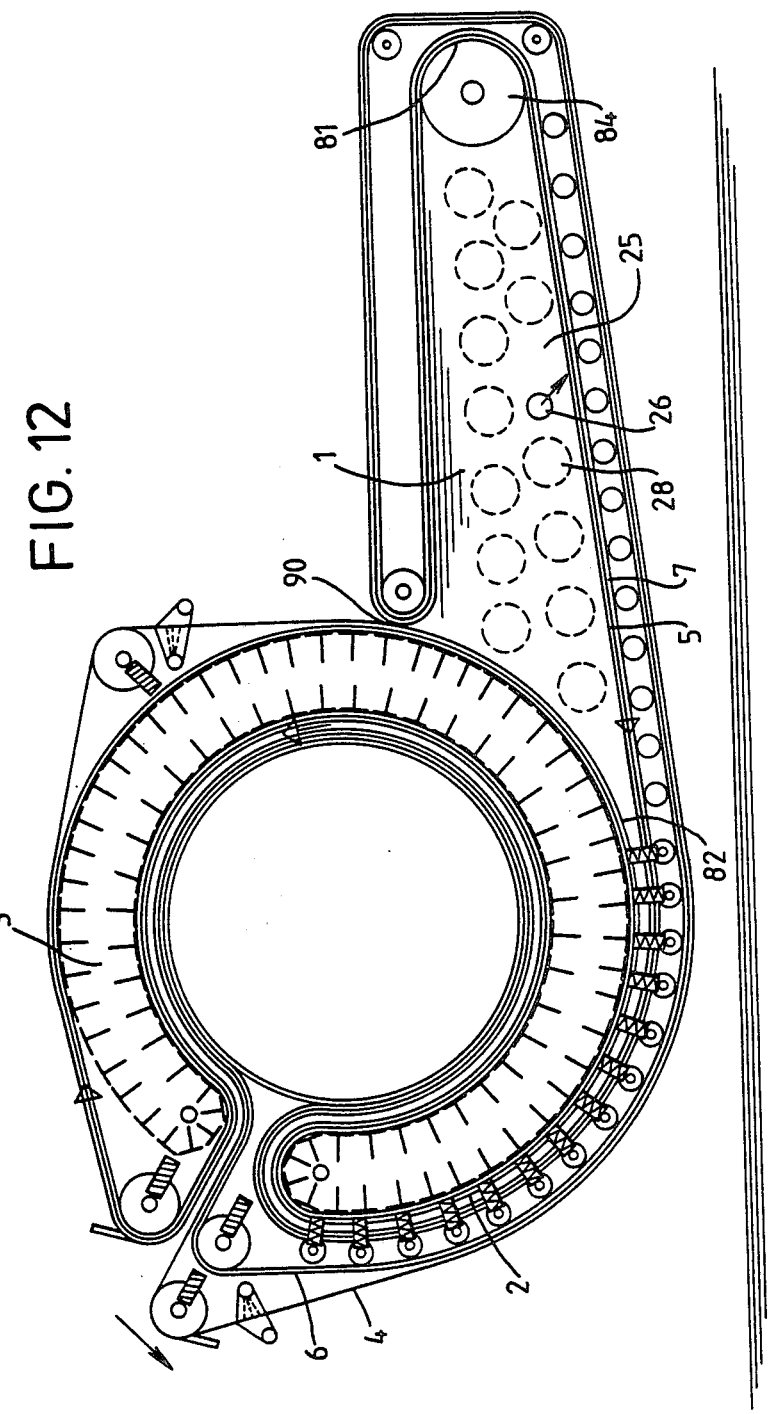
FIGS. 12 and 13 are schematic simplified sectional views of the seventh embodiment of the invention depicting two respective variants of said preliminary drainage stage.

FIG. 12 shows a further development of the preliminary de-watering stage according to FIG. 11. The filter band 5 with carrier belt 7 defines the topside of the sludge chamber 25 which is completely filled with sludge so that the surface area on the topside of the chamber is also available as a filter surface. With this type of sludge chamber, the simplest way of sealing the chamber is to arrange for the belts 5,7 and 4,6, which advance at the same speed to meet at position 90 where, if required, an additional flexible seal may be provided. This special arrangement offers the advantage, which is also present in the arrangement according to FIG. 11, that the operative pressure of the sludge pump (not shown) which feeds the sludge into the chamber through inlet 26 can be utilised to pressurise the sludge in the chamber. This has previously been described with reference to FIG. 8. In such preliminary drainage stage 1, water is not only gravitationally drained from the sludge but also squeezed out by the pressure which is applied by the sludge itself and this can result in a significantly higher solids percentage in the sludge at the point of entering into the medium pressure stage 2.

Another advantage arises from the fact that in the course of this preliminary drainage stage the sludge settles mostly on the filter bands through which the water is squeezed out by the pumping pressure so that the highest solids content will occur in the region of the filter bands 4,5 and carried direct into the medium pressure stage by these bands.

Figure 13:
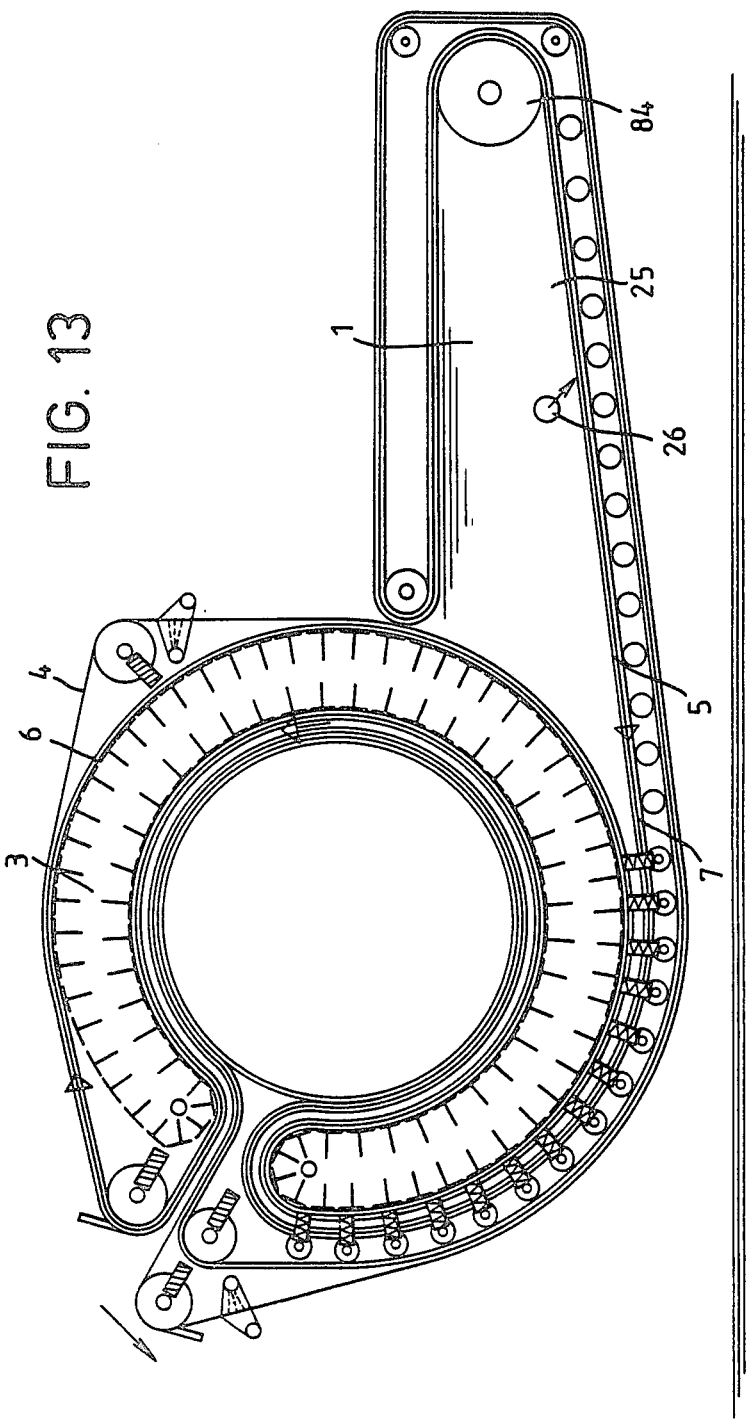

FIG. 13 illustrates a minor modification in respect of the arrangement according to FIG. 12, wherein the additional filter elements 28 in the interior of the sludge chamber 25 have been dispensed with because the effective application to the medium of pumping pressure will already achieve high water extraction rates.

Figure 14:
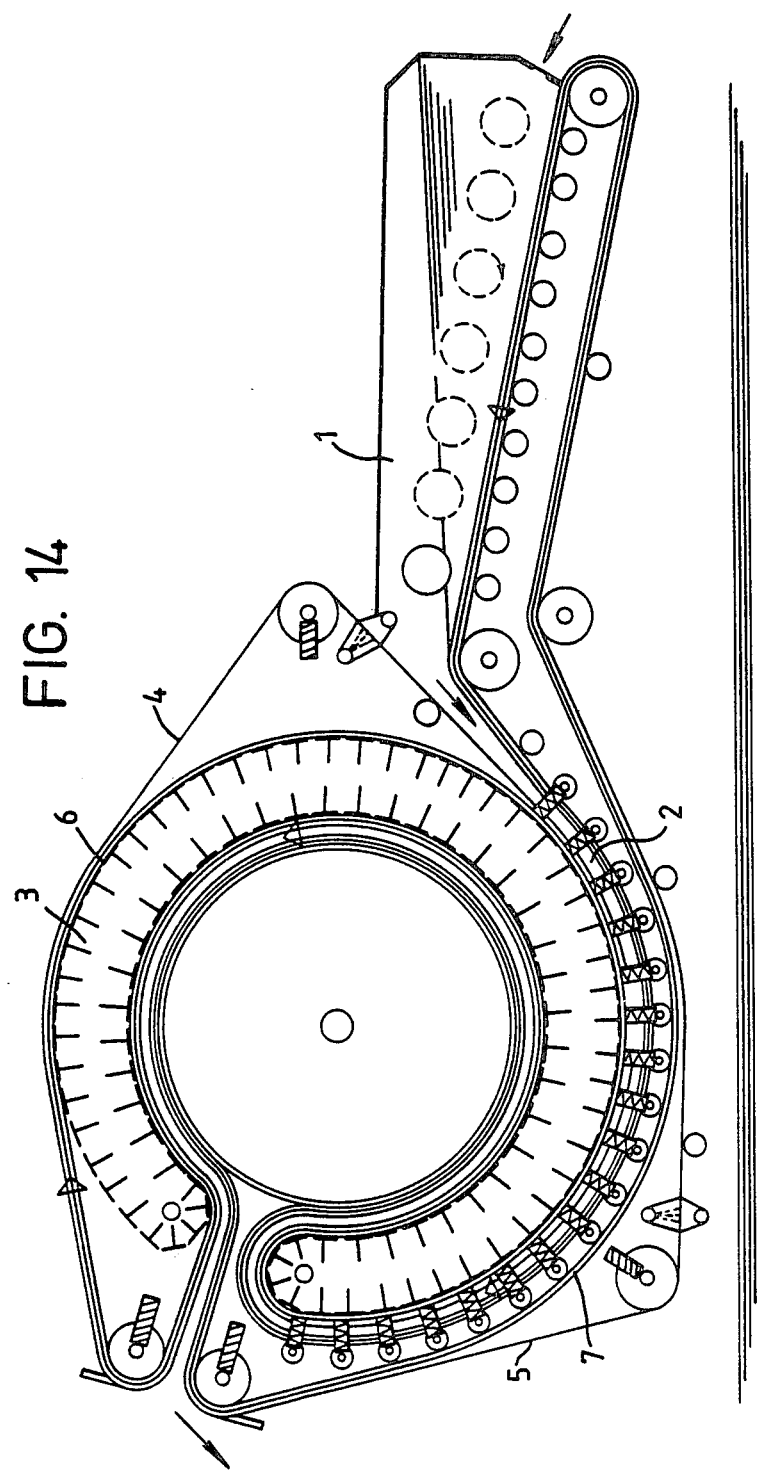
FIG. 14 is a schematic simplified sectional side elevation of a further embodiment of the invention.

FIG. 14 shows yet another embodiment of the invention wherein the preliminary drainage stage 1 is arranged beside the high pressure stage 3 and the medium pressure stage defined by a portion of the return run of the armour belt 36. This embodiment will be understood with reference to the description of the preceding examples.

FIGS. 21 to 24 show details of an embodiment of this invention wherein the supports 37 are not linked by roller chains to form an armour belt but are slidably guided on the drum 35, so that there is not return run of an armour belt. Apart from a very considerable saving in material, this design enables a close approach of positions 40 and 41, for example as in the arrangement of FIG. 7, i.e. of the points where filter bands 4,5 and carrier belts 6,7 mount or run off the drum 35.

For this reason, the drum 35 in the arrangement according to FIGS. 21 to 24 is wider than the filter bands 4,5 and carrier belts 6,7. The increased width of the drum 35 provides a bearing area for spring-mounted rollers 91 which support the T-section supports 37. The hydraulic pistons are mounted on the transverse supports 62 and extend through slots 92 provided on the enlarged side of the drum 35, all other details being the same or analogous to what has been described earlier with reference to the other embodiments.

Figure 24:
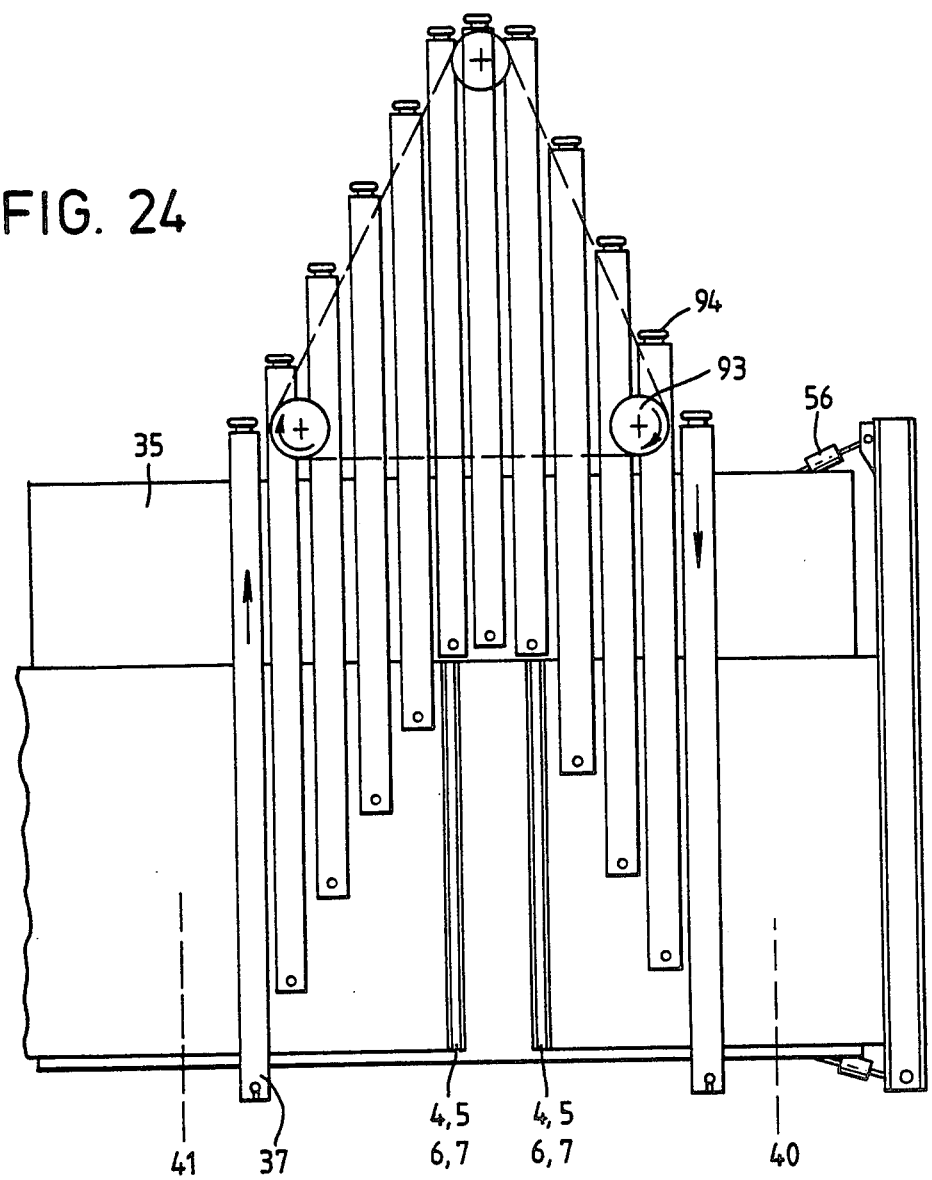
FIG. 24 is a schematic top view depicting the movement sequence according to FIGS. 21 to 23.
Figure 25:
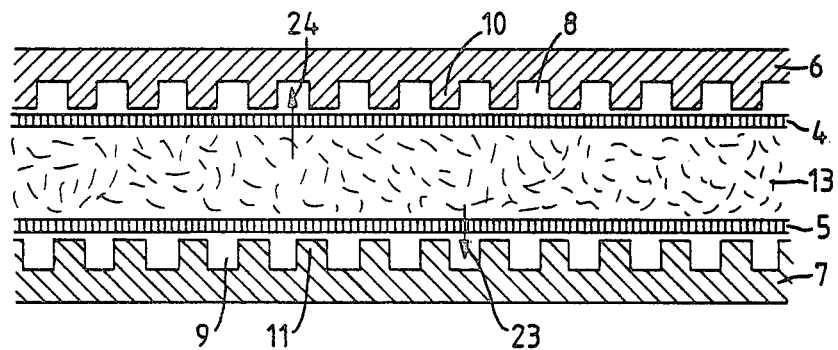
FIG. 25 is a sectional view of the filter bands and their supporting carrier belts.

FIG. 24 diagrammatically illustrates a drive 93 for laterally displacing the supports 37. The drive 93 engages coupling parts 94 on the supports 37 after the hydraulic cylinders 56 have decoupled and displaces them laterally away from the belts, and then returns them to their former position on the drum 35 when newly charged belts have arrived at and begun to mount the drum so that on their arrival at position 40, the supports 37 are ready for coupling to the hydraulic cylinders 56.

It is amply evident from the foregoing description that this invention provides a continuously operating chamber filter press, from which higher dry solids percentage yields may be expected than normally obtained from conventional chamber type filter presses.

The skilled man will readily appreciate that many variations and modifications could be made in any of the above described constructional arrangements without departing from the basic principle of this invention which resides in the provision of revolving filter chambers of variable volume in a chamber-type filter press, applying pressure individually and directly to each chamber and including the filter chambers by filter bands supported on carrier belts with lateral sealing means as well as by the sludge substance itself.

I claim:

1. A chamber-type filter press for de-watering a water containing substance comprising: a plurality of sequentially disposed fully enclosed filter chambers formed as a continuously advancing belt which are charged and discharged with said substance, said filter chambers being closed on their top and bottom sides by filter bands supported on revolving carrier belts and on their lateral sides with sealing means and at their front and rear, as viewed in the direction of advancement, by the substance to be de-watered; input means for feeding said substance between said filter bands and sealing means to form said filter chambers; and means for applying a high pressure to said filter chambers to dewater said substance comprising a plurality of pressure applying members which co-advance so as to revolve with and apply pressure to said filter chambers, and a plurality of pressure producers associated with said pressure applying members which co-advance so as to revolve with said filter chambers, each said co-advancing pressure producer originating a pressure and transmitting it to a said pressure applying member, said pressure producers, over at least a portion of the advancement of the filter chambers, causing application of a high pressure to substances contained therein which pressure increases in the direction of filter chamber advancement.

2. A chamber-type filter press according to claim 1 wherein said pressure producers cause the volume or cross-section of said filter chambers to be continuously reduced with progressive filter chamber advancement.

3. A chamber-type filter press according to claim 1 wherein said pressure producers cause each filter chamber to be individually and directly pressurized.

4. A chamber-type filter press according to claim 1 wherein said filter bands and carrier belts channel water water away from said filter chambers.

5. A chamber-type filter press according to claim 4 wherein said carrier belts are plastic or rubber belts advancing on rollers, which have a surface which carries the filter bands, each said carrier belt being provided with open-topped channels.

6. A chamber-type filter press according to claim 5 wherein said channels extend across the width of said carrier. belts.

7. A chamber-type filter press according to claim 6 wherein said channels extend at an angle relative to the direction of filter chamber advancement and the carrier belts and filter band region where pressure is exerted on said filter chambers extend at an inclination to the horizontal.

8. A chamber-type filter press according to claim 7 wherein the angle of inclination of the channels relative to the direction of advancement is 45°.

9. A chamber-type filter press according to claim 6 wherein the channels of relatively opposed carrier belts cross one another.

10. A chamber-type filter press according to claim 5 wherein said carrier belts have substantial lateral rigidity and their supporting rollers are provided with guide means for said carrier belts.

11. A chamber-type filter press according to claim 10 wherein said guide means are track-holding rims or flanges on the rollers.

12. A chamber-type filter press according to claim 1 wherein the path of advancement of the filter chambers is sub-divided into several stages at each of which a different magnitude of pressure is applied to the substance to be dewatered residing between the filter bands.

13. A chamber-type filter press according to claim 12 wherein said stages comprise at least one low pressure preliminary drainage stage in addition to a high pressure stage formed by said high pressure applying means.

14. A chamber-type filter press according to claim 13 wherein said stages comprise at least one medium pressure stage applying pressure to said substance which has a magnitude between the pressure applied in said preliminary drainage stage and that of said high pressure stage.

15. A chamber-type filter press according to claim 13 wherein the preliminary drainage stage comprises a substance chamber having sides and a bottom and an inlet for the substance to be treated, the bottom of said chamber being provided by a first de-watering region of the filter band which is supported on a first of said carrier belts.

16. A chamber-type filter press according to claim 15 wherein the first carrier belt with the associated filter band advances upwardly from said substance inlet.

17. A chamber-type filter press according to claim 15 or 16 further comprising a pump for pumping a substance to be de-watered into said chamber and keeping said preliminary drainage stage under pressure.

18. A chamber-type filter press according to claim 15 further comprising means for rinsing said filter belts and means for cleaning the filtrate and/or the rinsing water collected from said rinsing means.

19. A chamber-type filter press according to claim 18 wherein the cleaning means includes a pressure gate leading to the preliminary drainage stage.

20. A chamber-type filter press according to claim 18 or 19 wherein said cleaning means is formed by an ante-chamber in the substance chamber which has an inlet connected with a filtrate return line.

21. A chamber-type filter press according to claim 20 wherein the pressure gate is connected to the ante-chamber and consists of a rotating star-shaped vaned element in a housing.

22. A chamber-type filter press according to claim 20 wherein said ante-chamber has a circular cross-sectional configuration.

23. A chamber-type filter press according to claim 22 further comprising a filter element of smaller diameter than the diameter of the ante-chamber arranged in the ante-chamber.

24. A chamber-type filter press according to claim 22 wherein said filter element is rotationally driven.

25. A chamber-type filter press according to claim 24 wherein said filter element comprises externally projecting transverse blades, ridges or fins which engage with the ante-chamber walls in such a way that the filtrate inlet is separated from the sludge chamber for every rotational position of said filter element.

26. A chamber-type filter press according to claim 15 wherein said sludge chamber is a fully enclosed and sealed chamber and the walls are predominantly formed by revolving carrier belts and filter bands and means are provided for maintaining said sealed chamber pressurized.

27. A chamber-type filter press according to claim 26 wherein said means for maintaining said sealed chamber pressurized comprises pressure rollers of a medium pressure stage provided between said sealed chamber and drum.

28. A chamber-type filter press according to claim 26 wherein said means for maintaining said sealed chamber pressurized comprises a drum high pressure stage.

29. A chamber type filter press according to claim 15 further comprising filter elements which are partly or wholly submerged in the substance under treatment arranged in the substance chamber, said filter elements comprising water outlets leading externally of said chamber.

30. A chamber-type filter press according to claim 29 wherein said filter elements are cylindrical drums made of filter material.

31. A chamber-type filter press according to claim 29 or 30 wherein said filter elements are internally or externally provided with a rotatable cleaner.

32. A chamber-type filter press according to claim 31 wherein said cleaners include internal rotatable brushes.

33. A chamber-type filter press according to claim 31 wherein said cleaners include internally fitted brushes.

34. A chamber-type filter press according to claim 31 wherein the cleaners include brushes rotatable internally of and in the opposite sense to the filter elements.

35. A chamber-type filter press according to claim 31 wherein the cleaners include liquid spraying jets.

36. A chamber-type filter press according to claim 30 further comprising a rotary drive for the filter drums.

37. A chamber-type filter press according to claim 36 wherein said filter elements rotate in the same common direction which induces a conveying action in said direction towards an outlet of the substance chamber.

38. A chamber-type filter press according to claim 29 further comprising stationary cleaners provided externally or internally of the filter elements.

39. A chamber-type filter press according to claim 38 wherein said cleaners include internally fitted brushes.

40. A chamber-type filter press according to claim 38 wherein the cleaners include brushes rotatable internally of and in the opposite sense to the filter elements.

41. A chamber-type filter press according to claim 38 wherein the cleaners include liquid spraying jets.

42. A chamber-type filter press according to claim 1 wherein said co-advancing high pressure producers comprise a plurality of revolving hydraulic cylinders mounted on opposite sides of a revolving drum of relatively large diameter, said carrier belts and filter bands revolving with said drum, said hydraulic cylinders being arranged in pairs and the pairs of hydraulic cylinders being adapted to be coupled and de-coupled to and from co-revolving supports spanning the width of the carrier belts and arranged radially outwards of the outer carrier belt and serving as said pressure applying members, the coupled hydraulic cylinders and supports defining a pressure application stage about said drum.

43. A chamber-type filter press according to claim 42 further comprising a hydraulic control system for said hydraulic cylinders including hoses, a hydraulic pump, valves and associated controls.

44. A chamber-type filter press according to claim 43 wherein said hydraulic control system is arranged within or on the drum, the energy supply to said hydraulic pump being obtained by means of slip ring collectors or terminals.

45. A chamber-type filter press according to claim 43 wherein said hydraulic control system relieves said hydraulic cylinders when said cylinders are travelling through the de-coupling and re-coupling stages of their revolution and applies pressure to said cylinders causing them to apply squeezing pressure between said drum and co-revolving supports in the pressure stage of their revolution, said squeezing pressure increasing continuously or stepwise in the forward direction of drum and filter chamber advancement.

46. A chamber-type filter press according to claim 42 wherein said hydraulic cylinders are biassed by a biassing means towards their operatively engaged or coupled position with said supports, and said filter press further comprises means provided on opposed sides of the drum for laterally diverting said hydraulic cylinders to de-couple them from said revolving supports.

47. A chamber-type filter press as in claim 46 wherein said means for laterally diverting said cylinders are cams.

48. A chamber-type filter press according to claim 47 characterized in that the hydraulic cylinders are positively guided for de-coupling and re-coupling with said supports by a guide cam.

49. A chamber-type filter press as in claim 46 wherein said means for laterally diverting said cylinders are de-coupling guideways.

50. A chamber-type filter press according to claim 49 characterized in that the hydraulic cylinders are positively guided for de-coupling and re-coupling with said supports by a control guide.

51. A chamber-type filter press according to claim 42 wherein the supports which are coupled with and de-coupled from the hydraulic cylinders are mutually articulated at their lateral ends to form a revolving armour belt having one run which is substantially parallel with the outer surface of said drum in the pressure application stage.

52. A chamber-type filter press according to claim 51 wherein said supports are T-shaped and the articulated connection of the T-shaped supports is provided to the transverse support limbs which are relatively opposed along the pressure application stage of the drum.

53. A chamber-type filter press according to claim 51 wherein at least part of the return run of the armour belt acts as a revolving surface for at least one other de-watering stage connected upstream of said revolving drum stage.

54. A chamber-type filter press according to claim 53 wherein at least part of the return run of the armour belt acts as a revolving wall of a preliminary gravity drainage stage connected upstream of said drum.

55. A chamber-type filter press according to claim 53 wherein at least part of the return run of said armour belt is as a revolving support surface for a medium pressure de-watering stage connected upstream of said drum.

56. A chamber-type filter press according to claim 55 wherein said medium pressure stage is formed by pressure rollers which are biassed in a direction towards the armour belt, the carrier belts with their associated filter bands advancing between said pressure rollers and the armour belt.

57. A chamber-type filter press according to claim 42 wherein the supports which are adapted to be coupled with and decoupled from the hydraulic cylinders are independent of one another and are carried along the pressure application stage which leads around the drum by being each coupled with one hydraulic cylinder at both ends thereof.

58. A chamber-type filter press according to claim 57 further comprising drive unit at the coupling and de-coupling stations for the supports for laterally displacing the support out of the region wherein the filter bands and carrier belts mount the drum and for returning the supports back towards the drum for recoupling.

59. A chamber-type filter press according to claim 57 or 58 wherein said drum is wider than the filter bands and the carrier belts and the marginal edge of the drum wall comprises guide means for the supports.

60. A chamber-type filter press according to claim 59 wherein said guide means hold the supports for lateral sliding movement relative to the drum.

61. A chamber-type filter press according to claim 42 wherein the hydraulic cylinders are mounted to provide a limited amount of pivotal movement in the direction of rotation of the drum and coupling means are provided in the form of hookshaped lugs on the supports which are engageable with piston rods of the hydraulic cylinders on entering into a path tangential to the drum and disengageable therefrom when running out of said tangential path.

62. A chamber type filter press according to claim 42, 51 or 61 wherein the supports are mounted on link-roller chains provided on both sides of said supports.

63. A chamber-type filter press according to claim 62 wherein the spacing ratio of the supports relative to the spacing ratio of the link-rollers of the chains is at least 1:3.

64. A chamber-type filter press according to claim 1 wherein the circumferential revolution distance around the drum is sub-divided into several stages.

65. A chamber-type filter press according to claim 1 wherein the lateral seals of the filter chambers are provided by separately advancing sealing elements which are inserted between the filter bands on both sides of the chamber.

66. A chamber-type filter press according to claim 65 wherein the sealing elements are of circular cross-section and comprise continuous deformable rubber elements which advance with the filter bands.

67. A chamber-type filter press according to claim 65 or 66 wherein the sealing elements are hollow hoses.

68. A chamber-type filter press according to claim 67 wherein the sealing elements are filled with compressed air.

69. A chamber-type filter press according to claim 68 further comprising valves in the sealing elements for refilling said sealing element with air.

70. A chamber-type filter press according to claim 1 wherein the lateral seals of the filter chambers are provided by elastically deformable gasket strips secured on the filter bands.

71. A chamber-type filter press according to claim 70 wherein the gaskets from different filter bands are adapted to inter-engage when the associated filter bands are mutually opposed.

72. A chamber-type filter press for de-watering a water containing substance comprising: a continuously advancing belt assembly which is charged and discharged with said substance, said belt assembly comprising a pair of filter belts supported on respective revolving carrier belts and sealing means located on opposite lateral sides of and between the filter belts; input means for feeding said substance between said filter belts and sealing means; and means for applying a high pressure to said belt assembly to de-water a substance contained therein, said high pressure applying means comprising a plurality of pressure applying members co-advancing so as to revolve with said belt assembly for applying pressure thereto and a plurality of pressure producers respectively associated with said pressure applying members and co-advancing so as to revolve with said belt assembly, each said pressure producer originating a pressure and transmitting it to a said pressure applying member, said pressure producers, over at least a portion of the advancement of the belt assembly, causing application of a high pressure to substance contained therein which pressure increases in the direction of belt assembly advancement.

* * * * *